US010649117B1

(12) United States Patent
Lewellen et al.

(10) Patent No.: US 10,649,117 B1
(45) Date of Patent: May 12, 2020

(54) MULTICUBE RETROREFLECTOR AND RETROREFLECTOR-BASED COMMUNICATION SYSTEM

(71) Applicants: Triad National Security, LLC, Los Alamos, NM (US); Government of the United States of America as represented by the Secretary of the Air Force, Kirtland AFB, NM (US)

(72) Inventors: John Lewellen, Los Alamos, NM (US); John Harris, Albuquerque, NM (US)

(*) Notice: Subject to any disclaimer, the term of this patent is extended or adjusted under 35 U.S.C. 154(b) by 244 days.

(21) Appl. No.: 15/818,809

(22) Filed: Nov. 21, 2017

Related U.S. Application Data

(60) Provisional application No. 62/425,097, filed on Nov. 22, 2016.

(51) Int. Cl.
*G02B 5/122* (2006.01)
*G02B 26/08* (2006.01)

(52) U.S. Cl.
CPC ......... *G02B 5/122* (2013.01); *G02B 26/0816* (2013.01)

(58) Field of Classification Search
CPC .............................. G02B 5/122; G02B 26/0816
USPC ........................................................ 359/529
See application file for complete search history.

(56) References Cited

U.S. PATENT DOCUMENTS

| 3,975,083 A | 8/1976 | Rowland |
| 4,066,331 A | 1/1978 | Lindner |
| 4,643,427 A * | 2/1987 | Wozniak ............... A63F 9/1288 273/160 |
| 4,653,955 A | 3/1987 | Racs |
| 4,712,867 A | 12/1987 | Malek |
| 2008/0212182 A1* | 9/2008 | Nilsen .................... G02B 5/124 359/530 |
| 2010/0177402 A1* | 7/2010 | Maekawa .............. G02B 30/56 359/629 |

OTHER PUBLICATIONS

THORLABS Optomechanical Devices Webpage, https://www.thorlabs.com/navigation.cfm?guide_id=70 (last accessed Nov. 21, 2017).

* cited by examiner

*Primary Examiner* — Euncha P Cherry
(74) *Attorney, Agent, or Firm* — Leonardpatel P.C.; Michael Aristo Leonard, II; Sheetal Suresh Patel

(57) ABSTRACT

A "multicube" retroreflector may include "nested" corner cubes. Such a design combines the ease of fabrication of conventional corner cubes (e.g., stamping from a sheet) and the ability to easily and densely package them with a greater range of angles over which light will be reflected back towards the source. Such multicube retroreflectors may reflect 50% more light than corner cube retroreflectors. A retroreflector, or an array of retroreflectors, may be used as part of a communication system. A modulated retroreflector or an array thereof can form the basis of a unique communication system. For instance, by using a modulated retroreflector, or an array of such retroreflectors, a host system (e.g., an aircraft) can receive data from a remote system (e.g., a drone, an air-dropped sensor package, etc.) in a way that is difficult to intercept, and minimizes the power, computation, and antenna pointing requirements for the remote system.

18 Claims, 25 Drawing Sheets

RELATED ART

RELATED ART

RELATED ART

RELATED ART

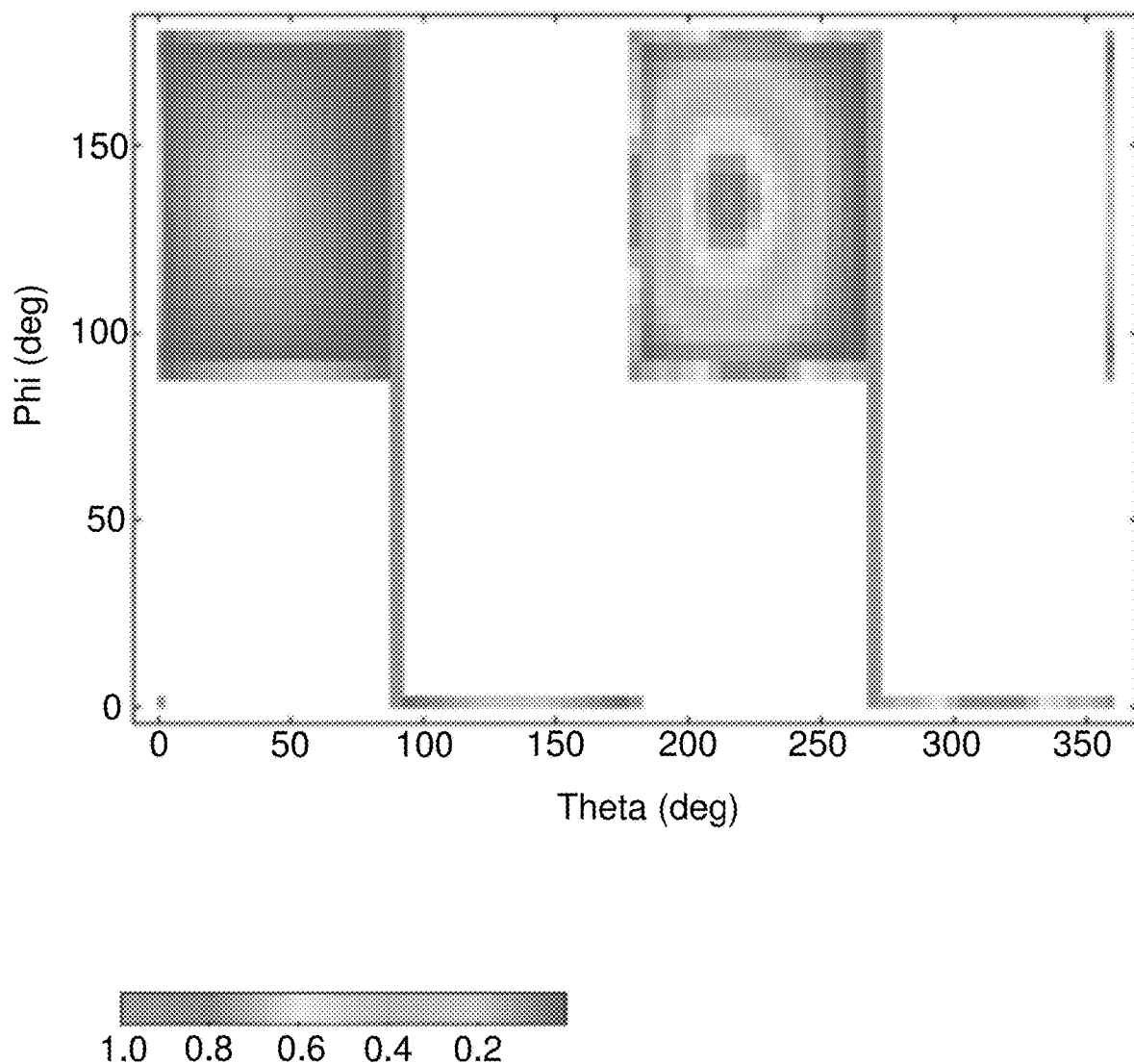

RELATED ART

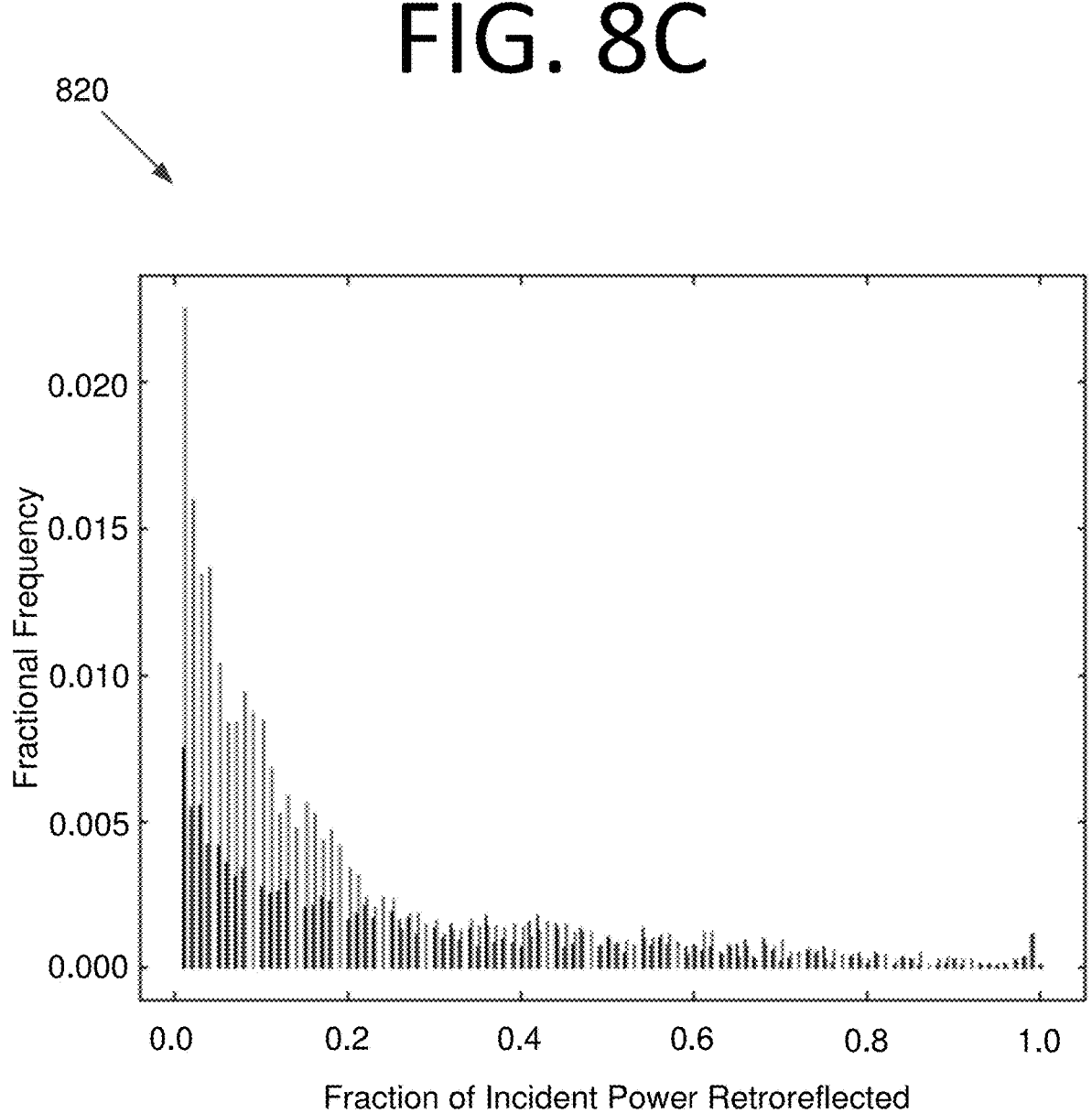

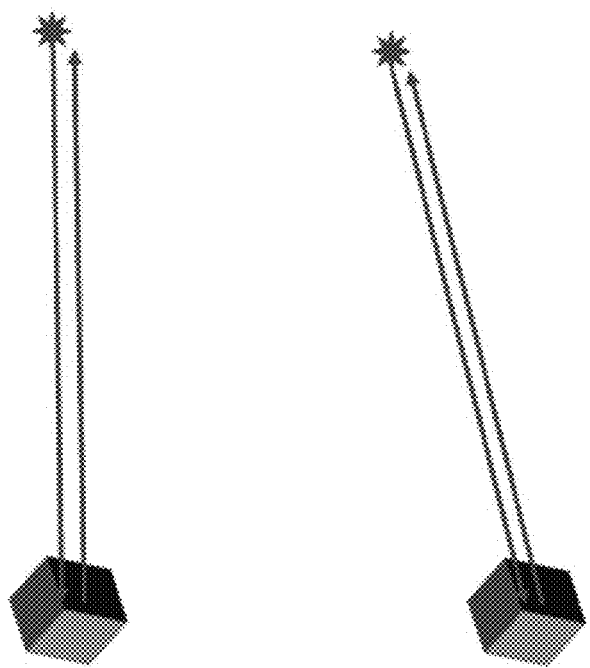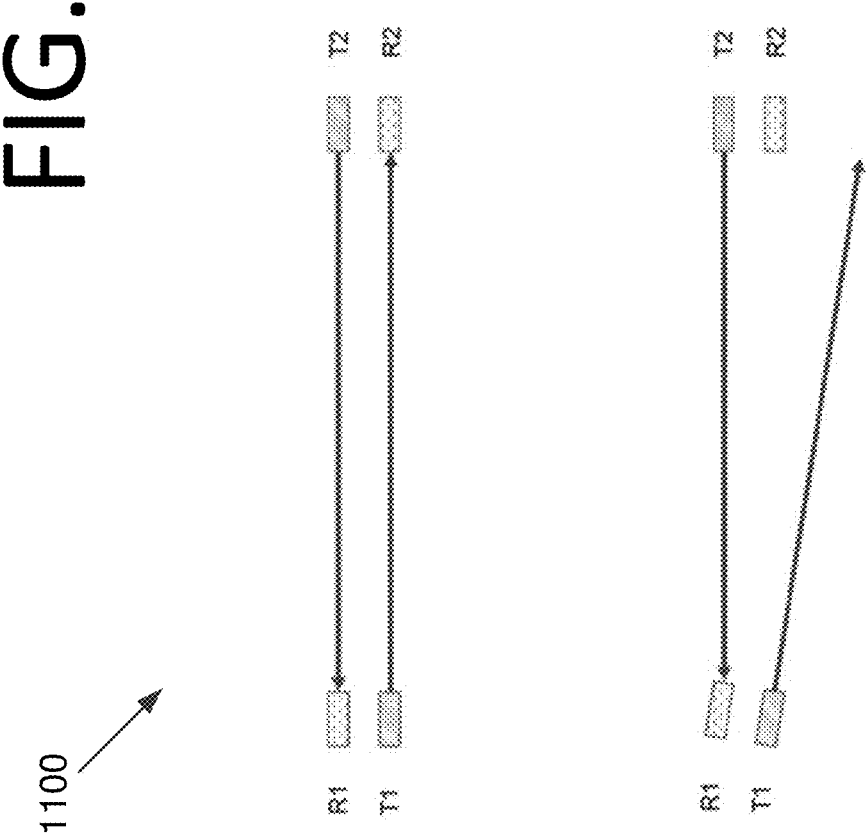
FIG. 11

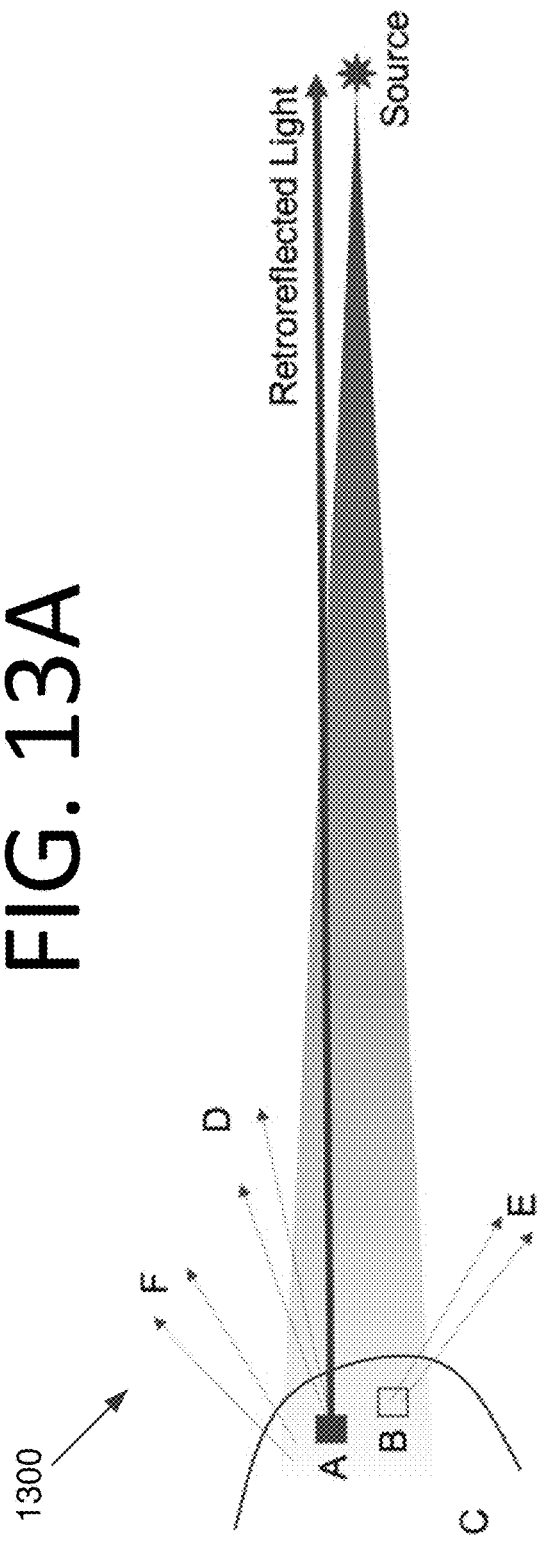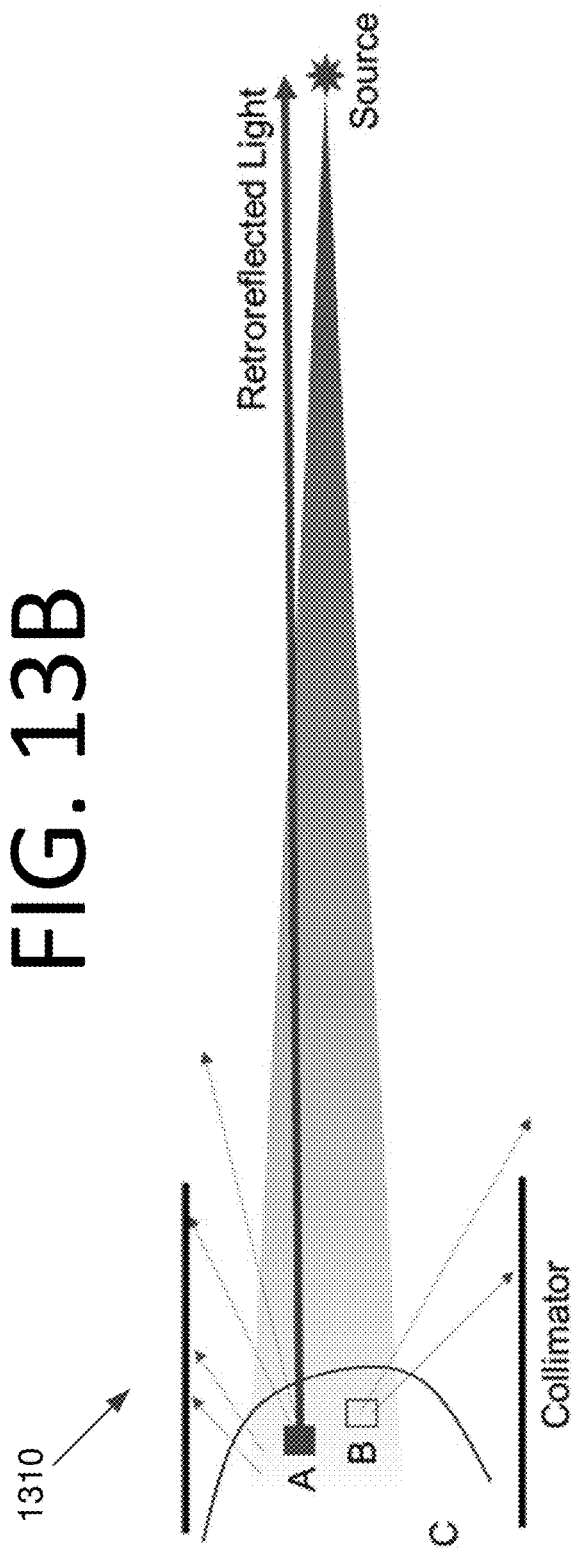

FIG. 19
1900
1910
1920
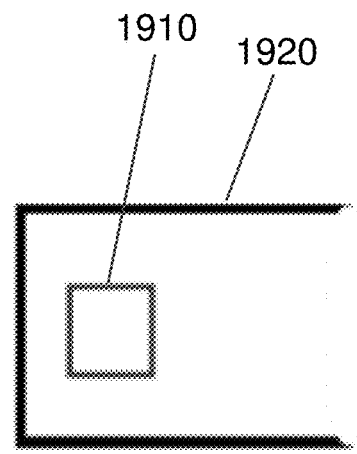
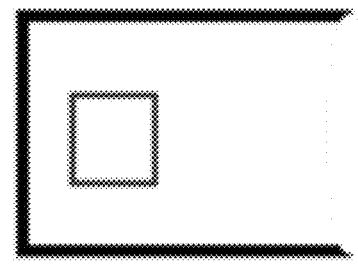
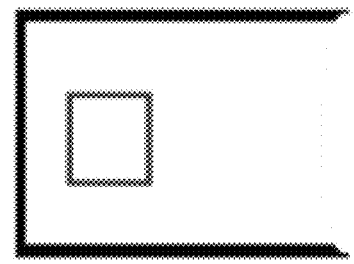

MULTICUBE RETROREFLECTOR AND RETROREFLECTOR-BASED COMMUNICATION SYSTEM

CROSS-REFERENCE TO RELATED APPLICATION

This application claims the benefit of U.S. Provisional Patent Application No. 62/425,097 filed Nov. 22, 2016. The subject matter of this earlier-filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to retroreflectors, and more particularly, to multicube retroreflectors that include nested corner cubes and retroreflector-based communication systems.

BACKGROUND

Retroreflectors are optical elements that can direct a significant fraction of light incident upon them back towards the source. There are two distinct regimes of interest with regards to retroreflector performance within an optical system. In the first regime, incident light is within a beam considerably smaller than the retroreflector in terms of transverse size, and only a single retroreflector is used. In this regime, one can expect that either 100% of the incident light or none is reflected back towards the source, depending upon whether the incident beam is within the corner cube's angular acceptance. These values are intended as illustrative only and do not include real-world effects, such as scattering of light from dust on the surface of the retroreflector, an optical coating that absorbs a portion of the incident light, etc. An example of this regime would be the use of a corner cube as part of an interferometer or similar optical instrument.

In the second regime, the incident optical beam has a transverse size equal to or larger than the retroreflector. Many retroreflectors may be used, in either a specific or random orientation, as part of the optical system to form a larger retroreflective surface or volume. However, the incident light still covers a larger area than any single retroreflective element. In this case, the incident beam "fills" the retroreflector(s), and the fraction of incident light reflected back towards the source is a more or less a smooth function of the orientation of the retroreflector(s) wholly or partially within the light beam. The second regime that is considered herein.

Arguably, the simplest retroreflector is the corner cube, which consists of three reflective plane surfaces. Light rays entering the corner cube's acceptance window are reflected back towards their source along parallel but potentially offset trajectories. FIG. 1 is a front perspective view illustrating a corner cube retroreflector 100. Corner cube retroreflector 100 can essentially be thought of as a cube with three of its six sides removed. From this perspective, corner cube retroreflector 100 is "indented," where back face 110, bottom face 120, and side face 130 form a recess with respect to the viewer. For a corner cube to return light towards its source, the source must be facing the "indented" (i.e., concave) side of the corner cube.

Given at least approximate prior knowledge of an optical system's configuration, corner cubes can be highly effective retroreflectors. For example, on a highway, the direction of car travel (and thus, the orientation of car headlights) is generally well known. Thus, corner cube-based retroreflectors can be highly effective at directing incident light back in the direction of the source (e.g., to increase a road sign's visibility to a driver). This type of corner cube can, in principle, be made easily from sheet metal via a stamping process.

There are situations, however, in which the orientation of an optical system is either not known or cannot be assumed to be static beforehand. In such cases, a retroreflector capable of returning light with a wider angular acceptance than a conventional corner cube is desirable. The most straightforward design of such a retroreflector may be a combination of eight corner cubes, joined at their inner vertices. As an alternate description, consider three orthogonal planes bisecting a cube and intersecting at the middle of the cube. This arrangement is shown in FIG. 2, and may be referred to as a "multiplane cross" retroreflector. Multiplane cross retroreflector 200 includes eight joined corner cubes, such as corner cube 240 with faces identified by plus signs. The eight corner cubes are defined by planes 210, 220, 230.

Multiplane cross retroreflectors have the advantage of being able to return at least some fraction of incident light back towards the source, regardless of the orientation of the retroreflector relative to the source. However, fabrication is more complex, as this shape cannot be simply stamped from a sheet. Also, multiplane cross retroreflectors cannot be packed efficiently into a small volume. Rather, they will be mostly "empty space." In comparison, conventional corner cubes made from stamped sheets can be densely packed, and so fit more retroreflectors into a given volume. However, conventional corner cubes do not work well for unknown or non-static optical systems. Furthermore, while retroreflectors have been used as part of "passive" systems (e.g., the Apollo missions left retroreflectors on the moon's surface that have been used to precisely measure the distance between the Earth and the moon using Earth-based lasers, and some security systems use retroreflectors for laser "tripwires"), these systems are not a communications system in any real sense as the "far end" doesn't provide any information back other than the retroreflection itself. Retroreflectors have not previously been used as part of an active two-way communication system. Accordingly, an improved retroreflector and retroreflector-based communication system may be beneficial.

SUMMARY

Certain embodiments of the present invention may provide solutions to the problems and needs in the art that have not yet been fully identified, appreciated, or solved by conventional retroreflectors. For example, some embodiments of the present invention pertain to a multicube retroreflector that essentially includes "nested" corner cubes. Certain embodiments pertain to a retroreflector, or an array of retroreflectors, that is/are used as part of a communication system.

In an embodiment, an apparatus includes an outer corner cube and an inner corner cube formed within the outer corner cube. Each of the outer corner cube and the inner corner cube includes three planes. The inner corner cube is smaller than the outer corner cube.

In another embodiment, a multicube retroreflector includes a first corner cube, a second corner cube formed within the first corner cube, and a third corner cube formed within the first corner cube or the second corner cube. Each of the first corner cube, the second corner cube, and the third corner cube includes three planes.

In yet another embodiment, a deployable stack of reflectors includes a plurality of multicube retroreflectors packed proximate to one another. Each of the multicube retroreflectors includes an outer corner cube and an inner corner cube formed within the outer corner cube. Each of the outer corner cube and the inner corner cube includes three planes.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 7C is a graph illustrating retroreflector efficiency as a function of angle for a multicube of the type shown in FIGS. 3A and 3B.

FIG. 8C is a histogram illustrating returned power fraction versus frequency for a corner cube and multicube with zero reflected power suppressed for easier comparison, according to an embodiment of the present invention.

FIG. 11 illustrates a comparison of the high sensitivity of a conventional optical communication link (left) and the reduced sensitivity of a retroreflector communication link (right), to alignment between the various elements of the communication link, according to an embodiment of the present invention.

FIG. 13A illustrates scattering of light in a retroreflector-based communication system without a collimator, according to an embodiment of the present invention.

FIG. 13B illustrates scattering of light in a retroreflector-based communication system with a collimator, according to an embodiment of the present invention.

FIG. 19 illustrates a collimated retroreflector array with three retroreflectors encased in respective collimators, according to an embodiment of the present invention.

DETAILED DESCRIPTION OF THE EMBODIMENTS

Some embodiments of the present invention pertain to a "multicube" retroreflector that essentially includes "nested" corner cubes. Such a design combines the ease of fabrication of conventional corner cubes (e.g., stamping from a sheet) and the ability to easily and densely package them with a greater range of angles over which light will be reflected back towards the source. Such multicube retroreflectors may reflect 50% more light than corner cube retroreflectors. Multicube retroreflectors could be used for multicube retroreflective chaff to frustrate laser pointers targeting aircraft (e.g., those taking off or landing from an airport) by reflecting a large portion of the laser light back at the transmitter, temporarily blinding the individual with the laser pointer and discouraging him or her from continuing to target the aircraft. Multicube retroreflectors may also be used as an aid to identify crash sites, to improve laboratory instruments that currently rely on corner cubes, etc.

Multicube retroreflectors may be used for optical systems such as interferometers where it is desirable for laser light to come back parallel to its source. This may provide a new way to make an interferometer. Yet another potential use is to distribute multicube retroreflectors over targets to track movement or distribute them over a region to show how vehicles and/or people disrupt them. Multicube retroreflectors may also be stamped into two-sided road signs. In some embodiments, multicube retroreflectors may be used to track air pollution or floated. In some embodiments, the multicube retroreflectors may be made from biodegradable plastic.

In certain embodiments, a retroreflector, or an array of retroreflectors, is/are used as part of a communication system. A modulated retroreflector (e.g., a retroreflector fitted with a mechanical or an electronic shutter), or an array thereof, can form the basis of a unique communication system. For instance, by using a modulated retroreflector, or an array of such retroreflectors, a host system (e.g., an aircraft) can receive data from a remote system (e.g., a drone, an air-dropped sensor package, etc.) in a way that is difficult to intercept, and minimizes the power, computation, and antenna pointing requirements for the remote system. By combining multiple retroreflectors in an array, data transmission rates can be improved.

Figure 3A:
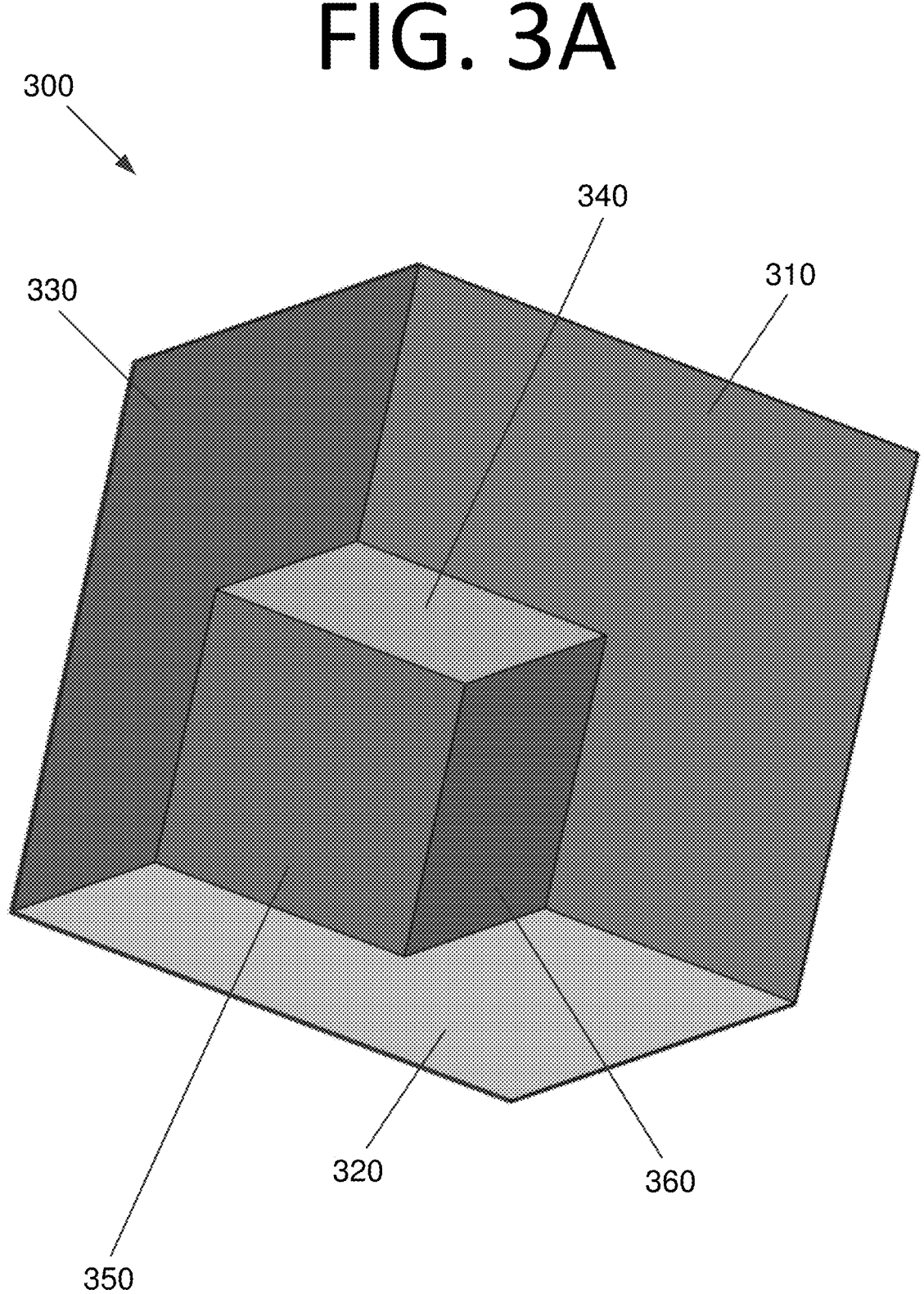
FIG. 3A is a front perspective view illustrating a multicube retroreflector, according to an embodiment of the present invention.
Figure 3B:
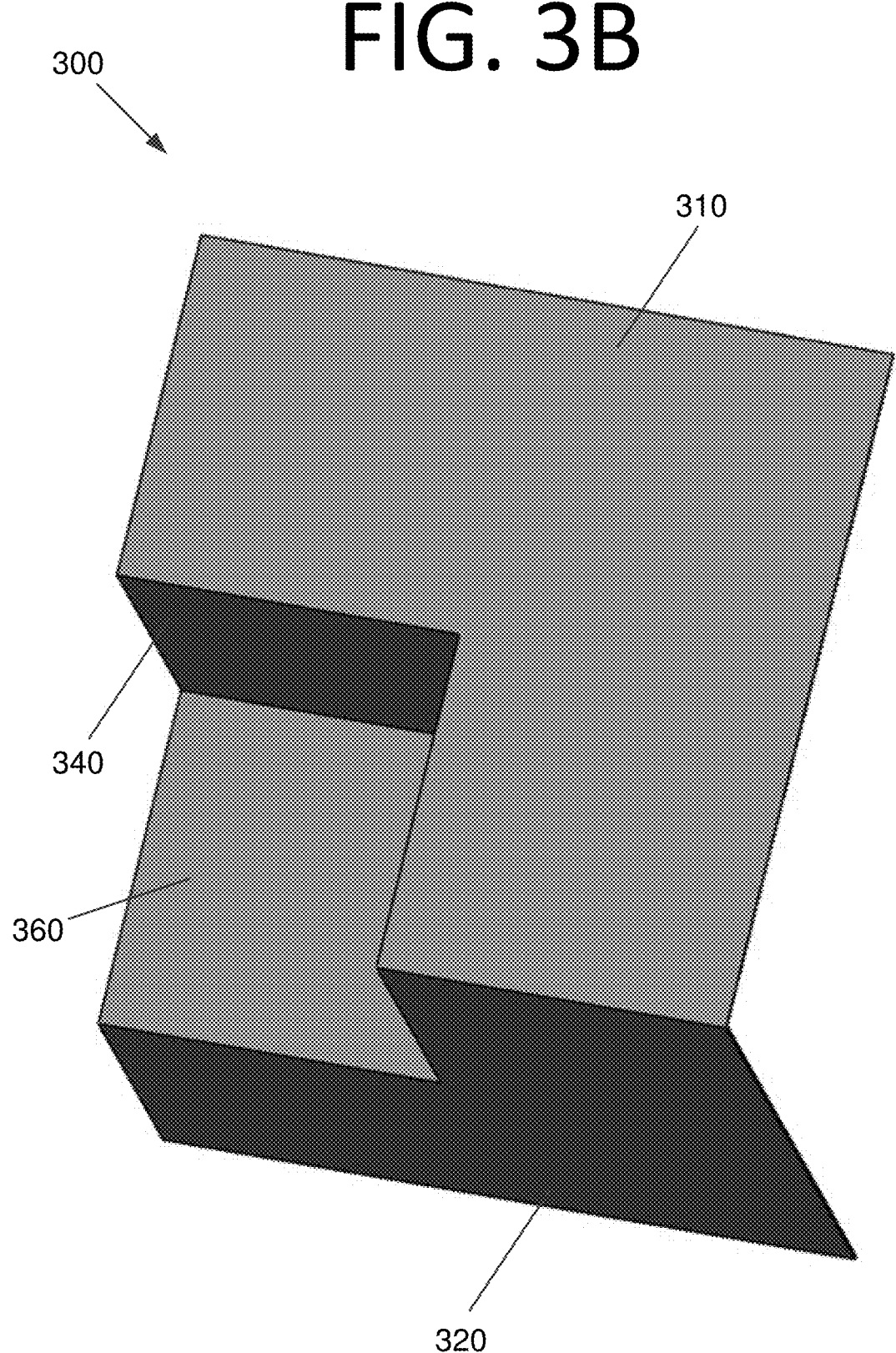
FIG. 3B is a rear perspective view illustrating the multicube retroreflector of FIG. 3A, according to an embodiment of the present invention.

FIGS. 3A and 3B are front and rear perspective views, respectively, illustrating a multicube retroreflector 300, according to an embodiment of the present invention. The multicube design of multicube retroreflector 300 shares the nestability of the conventional corner cube design while providing additional retroreflection from the "back" of multicube retroreflector 300. As can be seen in FIGS. 3A and 3B, multicube retroreflector 300 includes an "outer corner cube" consisting of sides 310, 320, 330 and an "inner corner cube" consisting of sides 340, 350, 360. However, any number and size of nested cubes may be included without deviating from the scope of the invention. From the perspective of FIG. 3A, the outer corner cube forms a recess and the inner corner cube extends outward towards the viewer. From the perspective of FIG. 3B, the opposite is the case.

The inner corner cube may be half the size of the outer corner cube or any other desired size without deviating from the scope of the invention. Various optical coatings may be used to suppress reflection at certain wavelengths, or have a reflection only at a particular wavelength. Generally, the corner cube should be considerably larger than the wavelengths of interest to be reflected. As the size of the cube approaches the optical wavelength, diffraction and interference effects would start to become important.

The orientation of the inner corner cube may be offset from that of the outer cube. In other words, referring to FIG. 3A, sides (i.e., planes) 340, 350, 360 must remain perpendicular to each other, but need not be parallel to sides (i.e., planes) 310, 320, 330, respectively.

Figure 4:
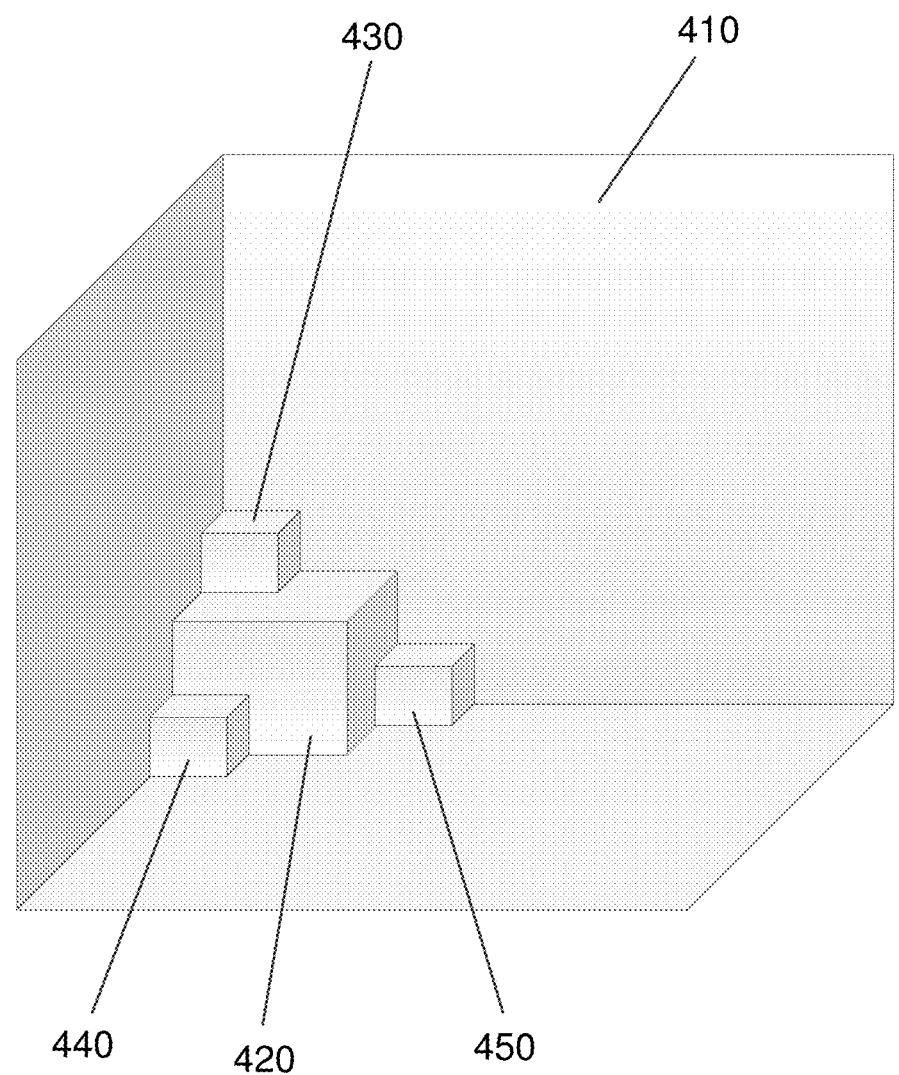
FIG. 4 is a front perspective view illustrating a multicube retroreflector with five nested cubes, according to an embodiment of the present invention.

FIG. 4 is a front perspective view illustrating a multicube retroreflector 400 with five nested corner cubes, according to an embodiment of the present invention. In this embodiment, multicube retroreflector 400 includes an outer corner cube 410 that is recessed with respect to the viewer, and a larger inner corner cube 420 and three smaller inner corner cubes 430, 440, 450 that extend outward towards the viewer. However, any size, number, and orientation of corner cubes may be used without deviating from the scope of the invention. Also, inner corner cubes may be of any size and at any desired location within the outer corner cube or another inner corner cube, either inwardly or outwardly "stamped". Alternatively, retroreflectors may be assembled from individual retroreflectors or otherwise assembled into the desired shape.

The 90° angles of the cube shape are necessary in some embodiments. The three planes need to be at 90° with respect to each other to guarantee the retroreflected light ray returns parallel to its incoming track. However, in some embodiments, inner cubes may not be exactly opposite in direction to the outer cube. More specifically, one or more of the inner rectangles may be shifted in $\theta$ and/or $\phi$ (see FIG. 6 for more details regarding $\theta$ and $\phi$). This is yet another aspect that may be tuned in order to modify behavior.

Figure 5A:
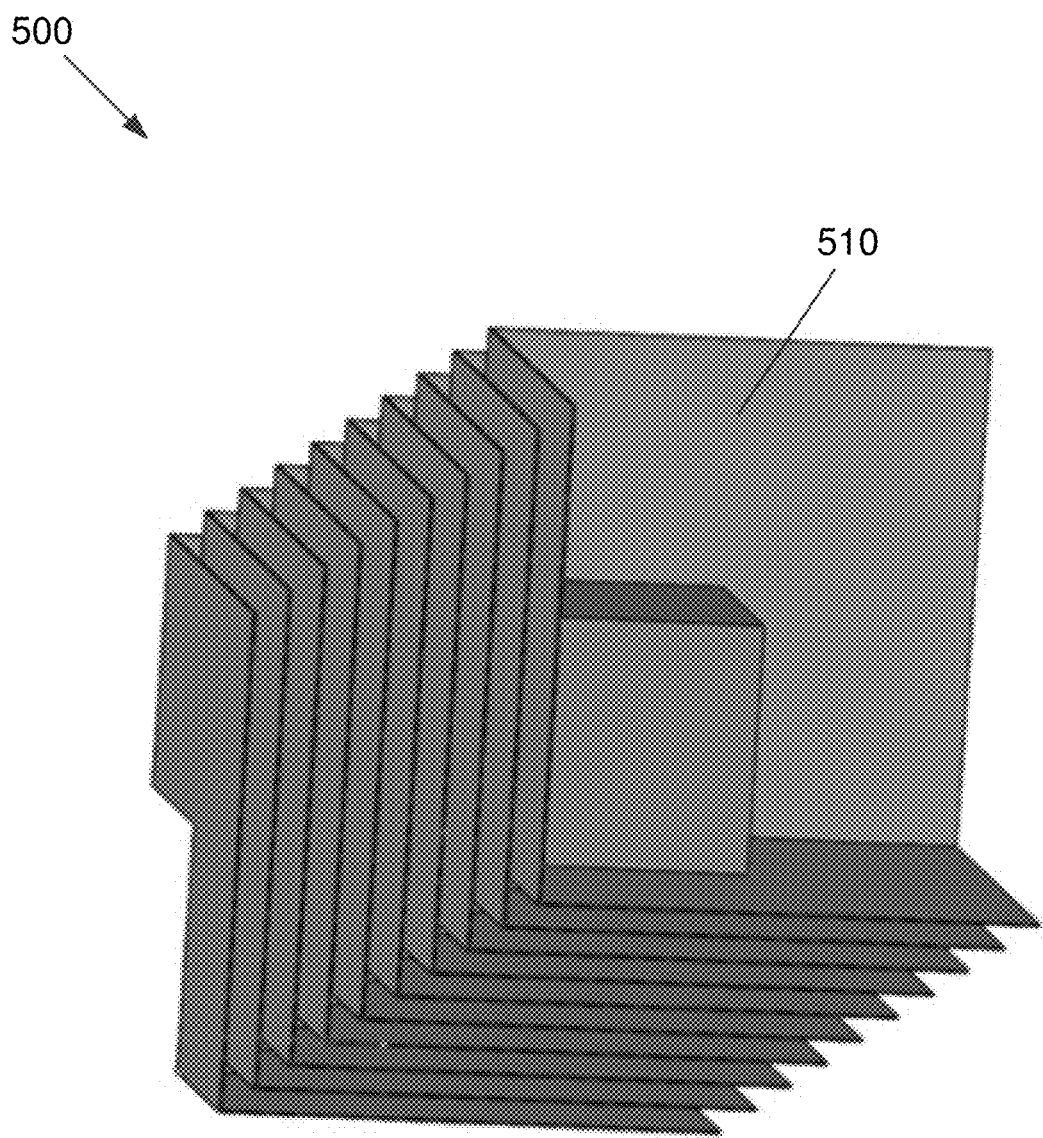
FIG. 5A is a front perspective view illustrating a stack of multicube retroreflectors, according to an embodiment of the present invention.
Figure 5B:
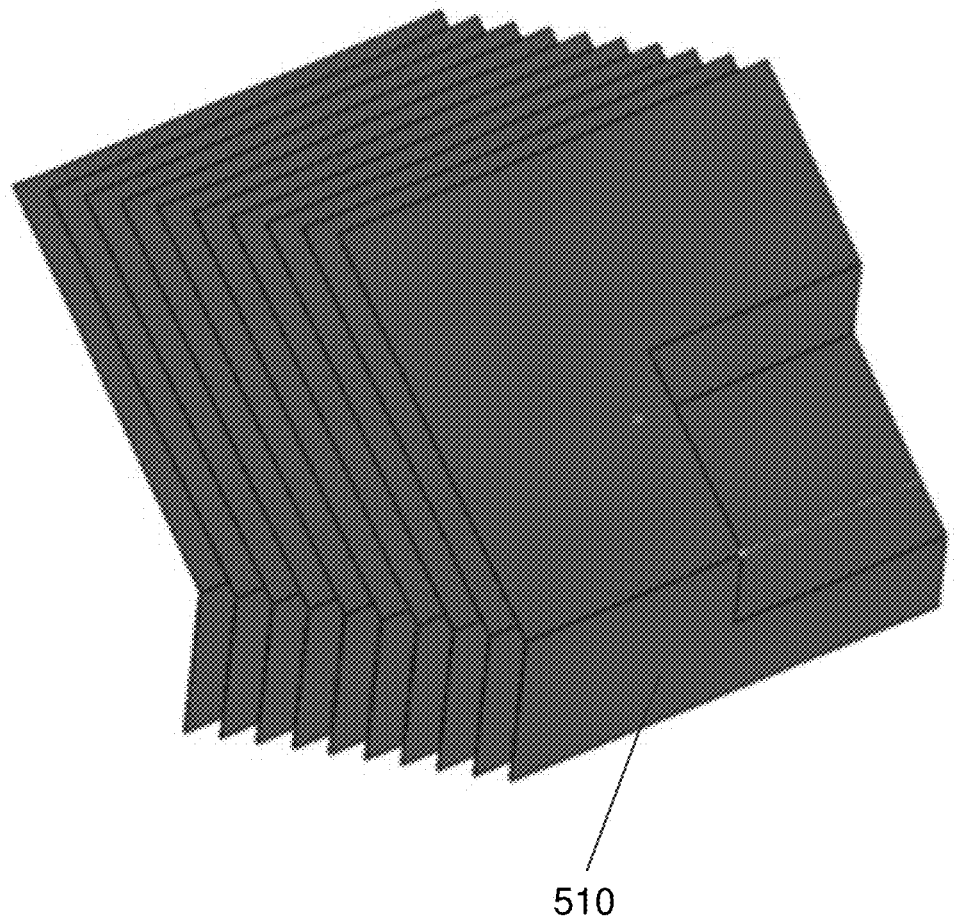
FIG. 5B is a rear perspective view illustrating the stack of multicube retroreflectors of FIG. 5A, according to an embodiment of the present invention.

FIGS. 5A and 5B are front and rear perspective views, respectively, illustrating a stack 500 of multicube retroreflectors 510, according to an embodiment of the present invention. As can be seen in FIGS. 5A and 5B, multicube retroreflectors 510 are easily positioned proximately next to one another, forming stack 500 with little wasted space. It should be noted that FIGS. 5A and 5B exaggerate the required space between the nested cubes for clarity. This provides a compact package that can readily be transported and distributed.

Performance Analysis

The performance of a conventional corner cube retroreflector, a multiplane cross retroreflector, and a multicube retroreflector are compered below by determining the fraction of the light incident on the retroreflector from a given angle that is returned towards the source. The orientation of an object in space can be set by three angles. However, in this specific case, the third angle would provide rotation of the retroreflector about the axis between the source and the retroreflector. This rotation will have no effect upon the fraction of light returned to the source so long as the source is larger than the retroreflector. In effect, a spherical coordinate system is used, with the retroreflector at the origin and the source sitting at $(r, \theta, \phi)$, where r is large compared to the dimensions of the retroreflector. In practice, the source location and retroreflector are fixed, and the retroreflector is rotated about two axes.

Figure 6:
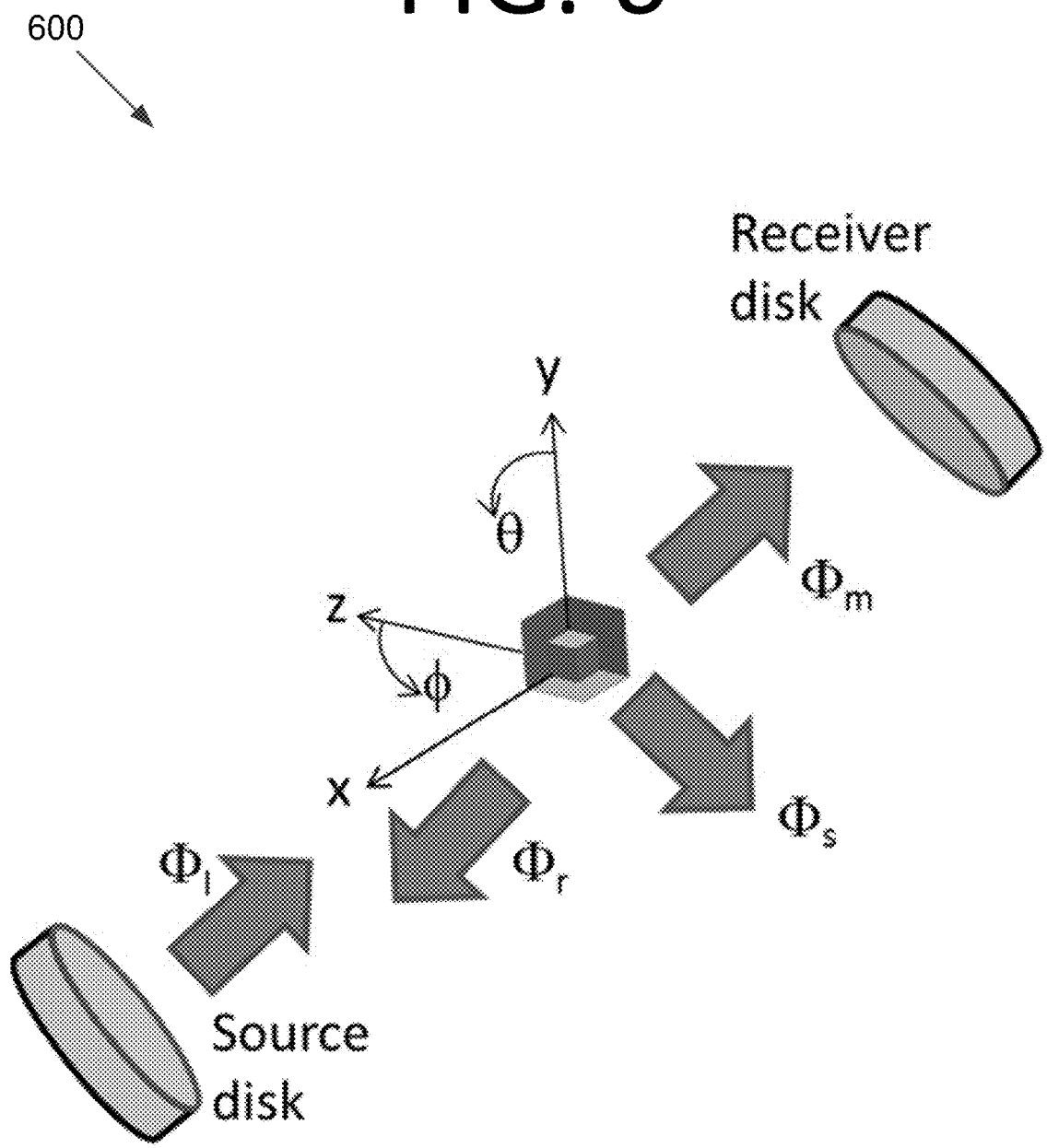
FIG. 6 illustrates a test geometry, according to an embodiment of the present invention.

To analyze the performance of a retroreflector, a simple model was constructed in the ray-tracing code TracePro™. The model uses a source-receiver pair with the retroreflector placed between them, as shown in test geometry 600 of FIG. 6. The retroreflector surfaces are assumed to be perfect mirrors, the mirrors are made from 0.005" thick sheets, and diffraction effects are assumed to be negligible. Overall outer dimensions of all retroreflectors are taken to be 1 cm. As shown in FIG. 6, the angle $\phi$ is a rotation about the y-axis and ranges from 0 to 180°. $\theta$ is a rotation about the z-axis and runs from 0 to 360°. $\Phi_I$ (on the bottom left) is the light flux emitted by the source (perpendicular to the disk and directed towards $-x$). $\Phi_m$ is the flux that misses the retroreflector and is incident upon the receiver disk. $\Phi_0 = \Phi_I - \Phi_m$ is the total flux incident on the retroreflector. Finally, $\Phi_r$ is the flux directed back towards the source, and $\Phi_s$ (next to the retroreflector) is flux reflected away from the source by the retroreflector: $\Phi_0 = \Phi_r + \Phi_s$.

The efficiency of the retroreflector is defined as a function of rotation angles as $$\eta(\phi, \theta) = \frac{\Phi_r}{\Phi_o} = \frac{\Phi_r}{\Phi_I - \theta_m} \quad (1)$$

The value of $\Phi_I$ is set by the source parameters, and $\Phi_r$ and $\Phi_m$ are obtained using the analysis functions of TracePro™.

Rotation Angle Sweeps

A separate trace of 10,000 light rays emitted from the source disk was performed for each pair of rotation angles to generate contour maps of the retroreflector efficiency versus the rotation angles. The results are shown in graphs 700, 710, 720 of FIGS. 7A-C. $\phi$ and $\theta$ were swept in 5 degree steps from 0 to 180° and 0 to 180°, respectively.

Figure 7A:
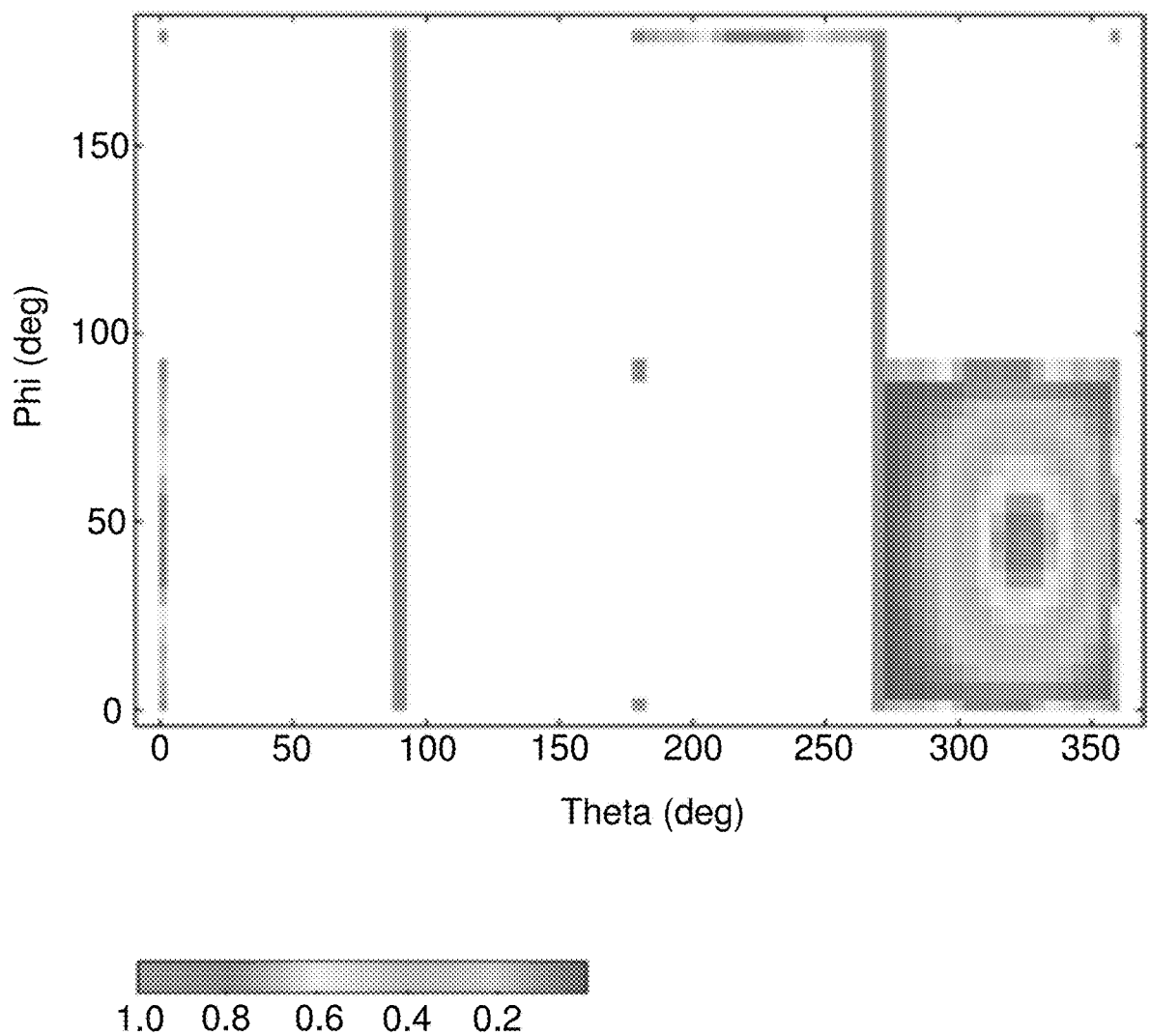
FIG. 7A is a graph illustrating retroreflector efficiency as a function of angle for a corner cube.

The efficiency map for the conventional corner cube in FIG. 7A is not surprising. For approximately ⅛ of the total range of available angles, the corner cube opening "faces" the source and provides continuous retroreflection, and approaches 100% when the corner is "aimed" directly at the source. Otherwise, the corner cube presents an outer surface to the source, and the incident flux is mostly directed away from the source. The exception is in the particular instance when the outer surface is parallel to the source, at which point, retroreflection is 100%. Here, it is assumed that all surfaces of the corner cube are mirrored.

Figure 1:
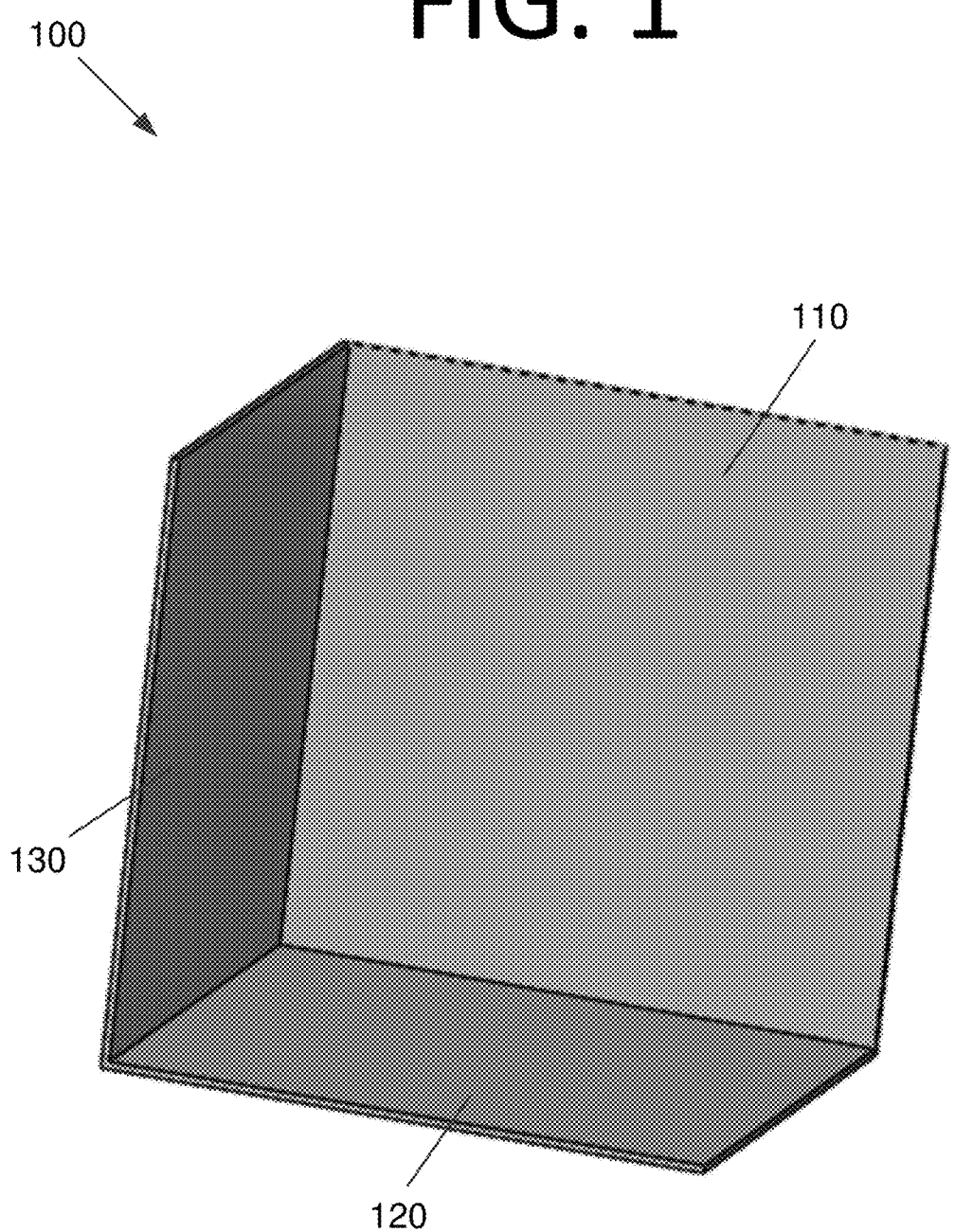
FIG. 1 is a front perspective view illustrating a corner cube retroreflector.
Figure 2:
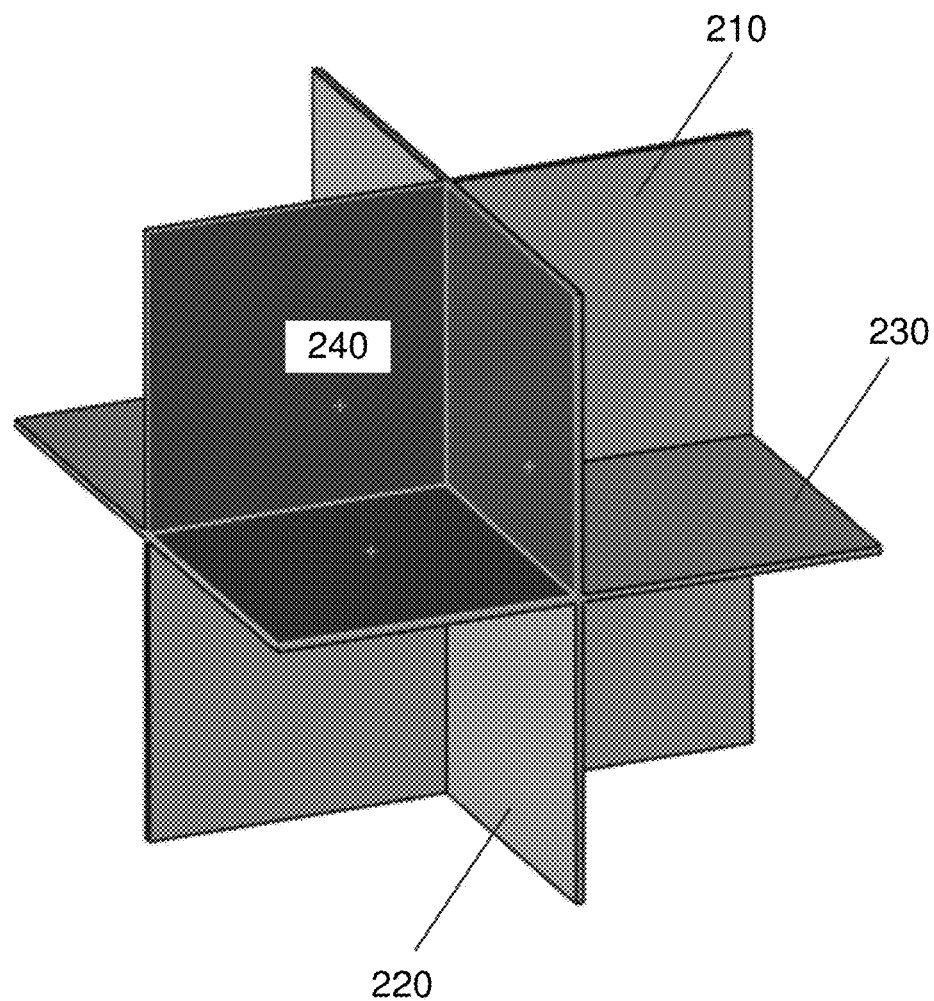
FIG. 2 is a front perspective view illustrating a multiplane cross retroreflector.
Figure 7B:
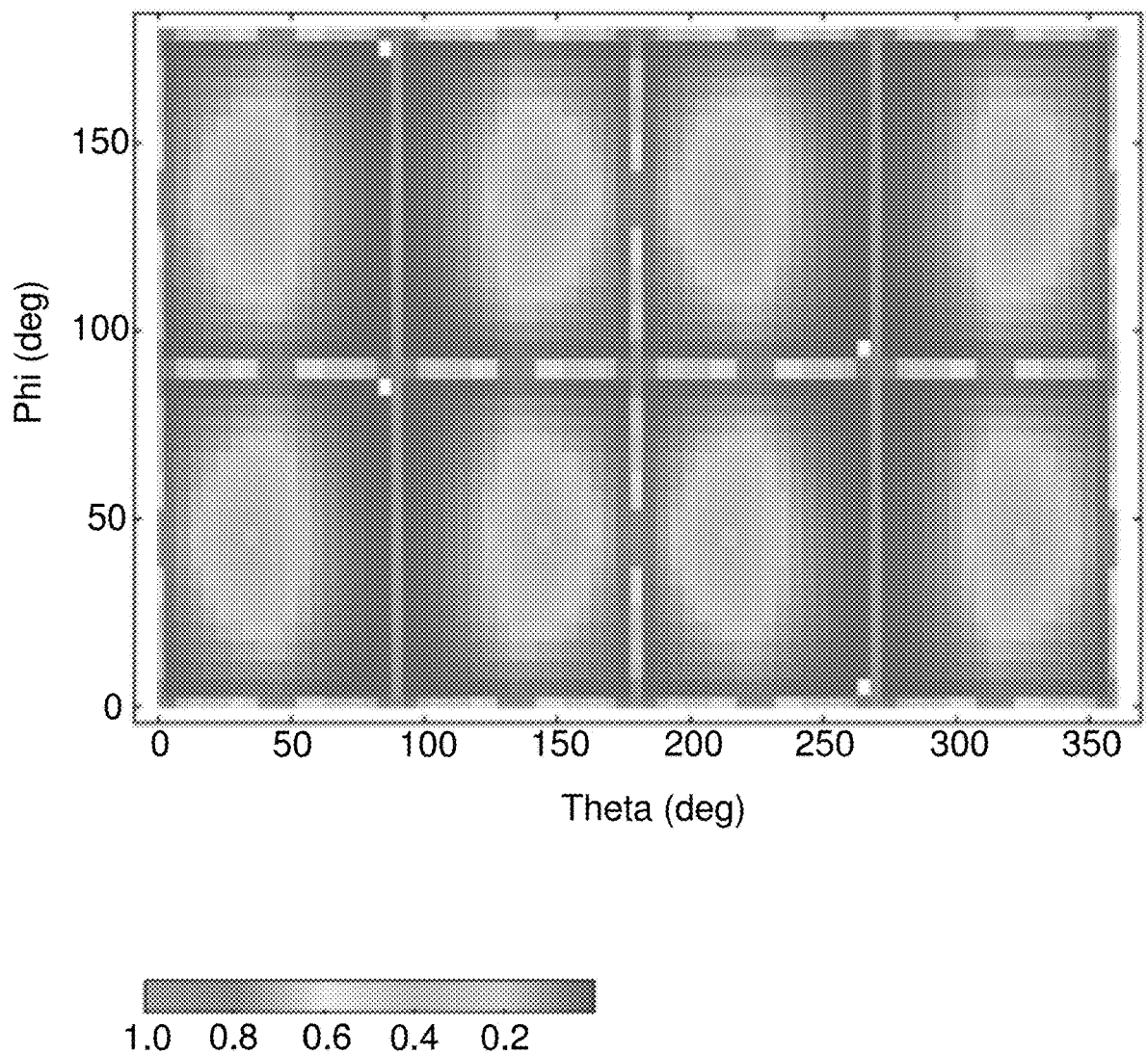
FIG. 7B is a graph illustrating retroreflector efficiency as a function of angle for a multiplane cross.

The efficiency map for the multiplane cross in FIG. 7B may appear to be surprising because, except when one of the planes is normal to the direction to the source, the retroreflection efficiency never exceeds approximately 50%. However, consider multiplane cross retroreflector 200 of FIG. 2. Flux incident on corner cube 240 will be retroreflected. However, flux incident on the other surfaces will be reflected away from the source. The total projected area of the "retroreflective" region never exceeds 50% of the total projected area. Thus, the maximum efficiency is relatively low.

The multicube retroreflector of some embodiments exhibits the same high efficiency (approaching 100%) as the conventional corner cube when the corner is "aimed" at the source, as seen in FIG. 7C. However, it also exhibits reasonably high efficiency when the "back" is aimed at the source as well, as anticipated from the geometry. Here again the reduction in efficiency is simply the projected area of the "inset" cube versus the total projected area when viewed from the back. The multicube reflector therefore provides the same ease of fabrication as conventional corner cubes (e.g., by a stamping process) while improving the overall retroreflection efficiency.

Random Angle Settings

For each retroreflector, 15,000 random number pairs were generated for ($\phi$, $\theta$), uniformly distributed between 0 to 180° and 0-360°, respectively. To verify the earlier statement regarding rotation of the retroreflector about the axis between the source and retroreflector, a similar study was also performed setting all three possible rotation angles randomly for the multicube retroreflector. The weighted-average retroreflected power fraction agreed to 1.5% between the two calculations. For each pair, ray-tracing analysis was performed, and the probability of returning a given fraction of incident flux to the source was analyzed. The results provide both a probability distribution for the fraction of retroreflected flux and a weighted-average fraction of incident power that is retroreflected back towards the source.

Figure 8A:
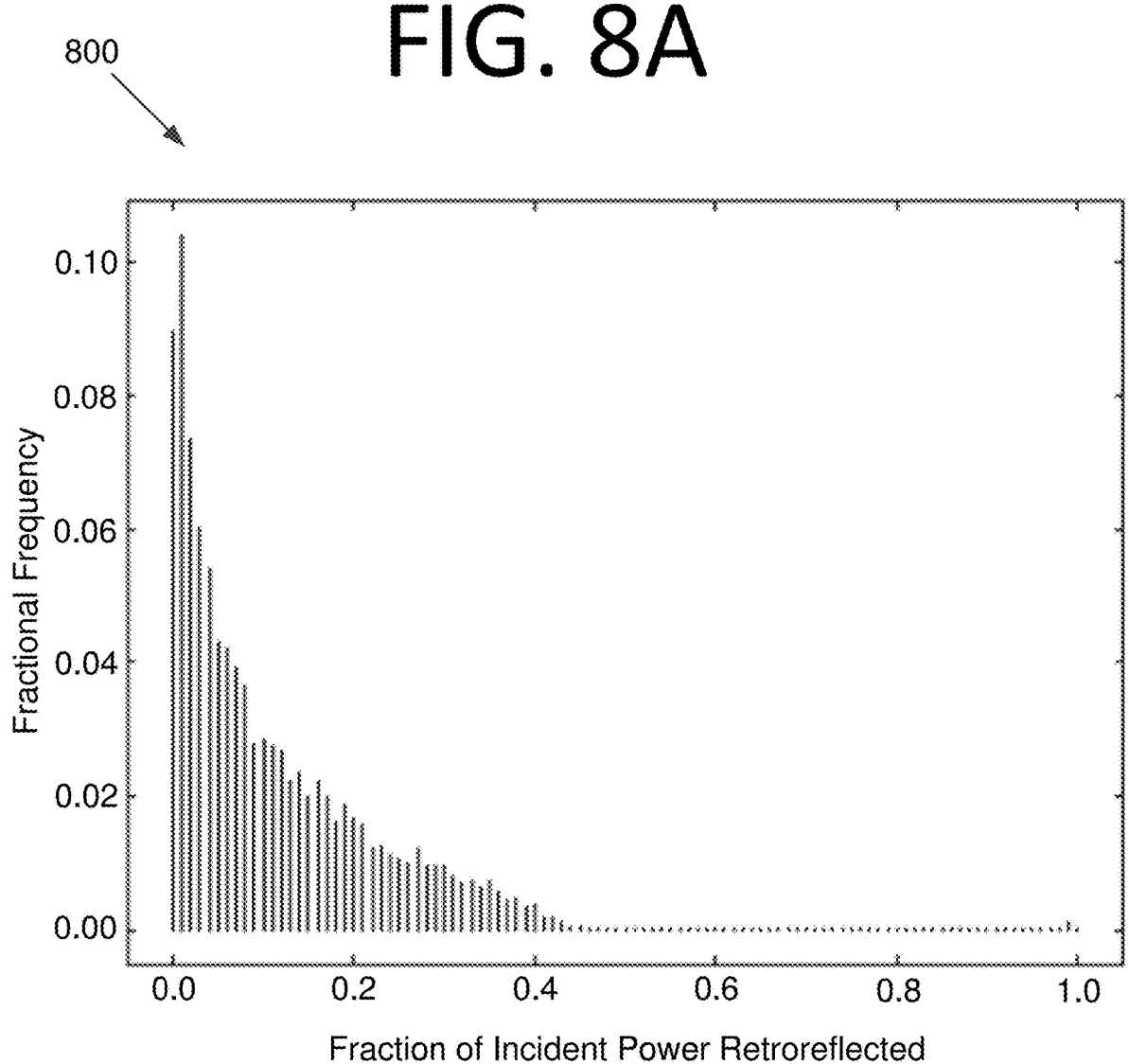
FIG. 8A is a histogram illustrating returned power fraction versus frequency for a multiplane cross.

FIG. 8A is a histogram 800 of the fraction of incident power retroreflected towards the source versus the frequency of that fraction being returned for the multiplane cross retroreflector. The most likely retroreflection will be a few percent of incident power returned to the source. As would be anticipated considering FIG. 7B, in general, no more than 40% of the incident power would be returned. The very small increase near 100% corresponds to the case where one of the planes is almost exactly normal to the direction to the source.

Figure 8B:
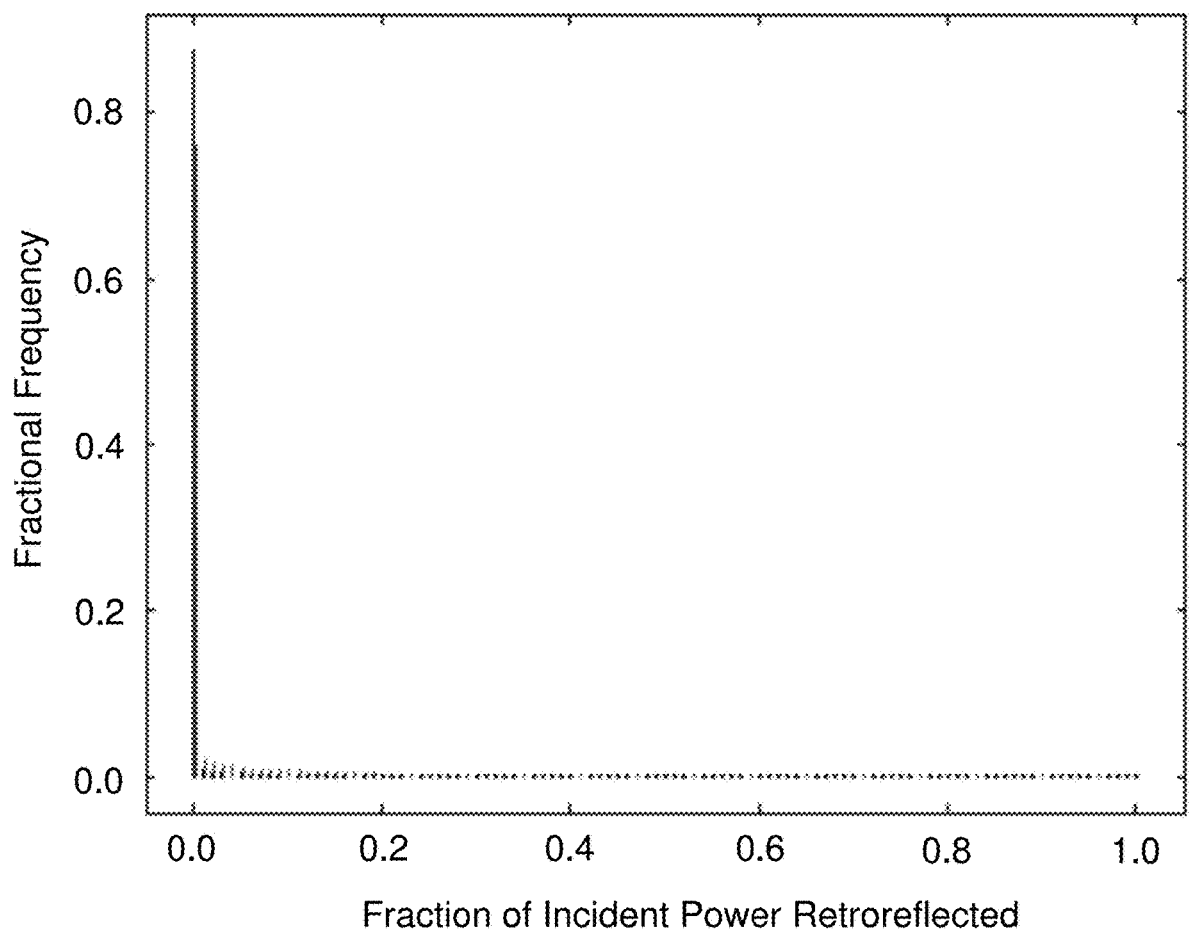
FIG. 8B is a histogram illustrating returned power fraction versus frequency for a corner cube and multicube at full scale, according to an embodiment of the present invention.

Histograms 810, 820 of FIGS. 8B and 8C compare the performance of a conventional corner cube with the multicube design of some embodiments. As expected from the results above, the majority of the time, both designs return zero reflected power back to the source. However, the multicube is approximately twice as likely to return non-zero power. Histogram 810 of FIG. 8B suppresses the zero-return case for a more clear comparison between the two designs. The performance improvement of the multicube over a simple corner cube is clearly evident. The two designs are approximately equal in performance when more than approximately 25% of power is returned to the source. However, for return powers between 0 and 25%, the multicube is much more likely to return at least some power to the source. Again, this is what would be expected given the $\phi$-$\theta$ plots shown above.

The expected fraction of incident power return can be calculated as the simple average power returned over the set of random orientations. The results are summarized in Table 1 below.

TABLE 1

AVERAGE RETURN POWER FRACTION PER RETROREFLECTOR

| Retroreflector Design: | Average Fraction of Incident Power Retroreflected: |
|---|---|
| Multiplane Cross | 11.5% |
| Corner Cube | 3.3% |
| Multicube | 4.6% |

The results for the corner cube and multicube are surprisingly high, given the histograms shown above. In essentially any orientation, the multiplane cross will return at least some incident power to the source. While this is not true of either the corner cube or the multicube, when they do retroreflect, these designs are more likely to reflect a higher fraction of the incident power back to the source.

The increased performance of the multicube versus the conventional corner cube is clear. The approximately 40% gain in average reflected power is in line with what would be expected from consideration of the above results. In terms of average power return to the source, as a single retroreflector, the multiplane cross is clearly the most effective. On average, given a random orientation with respect to the source, and having the same transverse dimensions, a single corner cube will return 29% and a single multicube will return 40% of the power that a single multiplane cross will return.

Packing Density

Given a priori ability to set the orientation and distribution of retroreflectors with respect to a source, such as on a highway traffic sign, corner cubes are effective and economical choices. Given only a single retroreflector to be deployed with unknown orientation relative to a source, a multiplane cross is the clear choice. However, if the intent is to be able to deploy multiple retroreflectors, the ability to store retroreflectors prior to deployment can be an important consideration.

Multiplane crosses, due to their geometry, do not pack tightly. Multiplane crosses with a transverse dimension L and made from infinitely thin material can only be packed at a maximum density of $2/L^3$. However, assuming infinitely thin material for corner or multicube retroreflectors would result in an infinite storage density, so several assumptions are made to calculate a comparable packing density. First, assume that the material thickness is $10^{-2}$ of the transverse dimension of the retroreflector. Further assume that the retroreflectors must be separated by ½ of their material thickness. Adding an additional corner cube or multicube to a stack increases the total volume occupied by the stack by $1.5 \times 10^{-2} L^3$. The maximum possible packing density for either a corner cube or a multicube is thus $67/L^3$, given these assumptions for sheet thickness and separation relative to the basic dimensions. Thinner sheets and smaller separations yield correspondingly higher packing fractions.

For a practical example, a typical chaff cartridge might have the dimensions 20.5 cm×2.5 cm×2.5 cm. This cartridge could hold approximately 17,000 multiplane cross retroreflectors that measure 0.5 cm per side, again assuming zero thickness for the planes and perfect packing. In contrast, consider either corner cubes or multicubes stamped out of 0.002" sheet stock with a transverse dimension of 0.5 cm. The same chaff cartridge could, given a separation of 0.001" between stacked retroreflectors, hold approximately 65,000 multicubes or corner cubes, or approximately 4 times as many retroreflectors. Note that the larger the size of the retroreflector, the larger the ratio becomes against multiplane crosses.

If dispersed into a cloud of equal volume, an incident optical beam would therefore be approximately 3.8 times as likely to illuminate a corner cube or multicube than a multiplane cross, all else being equal. A cloud composed of corner cubes would be expected to return about the same amount of light as one composed of multiplane crosses. A cloud composed of multicubes, however, would be expected to return approximately 50% more light to the source than one composed of multiplane crosses. Note that this estimate assumes that any incident light incident upon a retroreflector but not returned directly to the source is simply lost. It does not account for the possibility of light returned to the source after encountering multiple retroreflectors.

The expected performance of a new multicube retroreflector design of some embodiments has been evaluated and compared to two conventional retroreflector designs—the corner cube and the multiplane cross. The multicube retains the advantages of corner cube retroreflectors:—ease of fabrication and high packing density—while significantly increasing the average fraction of light returned to the source compared to a corner cube. A preliminary comparison of the performance of multicubes compared to multiplane retroreflectors, taking into account estimates for achievable packing fraction, suggests that the multicube could significantly outperform multiplane retroreflectors when randomly distributed from a fixed-size container.

As discussed above, a retroreflector, or an array of retroreflectors, may be used as part of a communication system in some embodiments. While these retroreflectors may have a nested cube architecture, a corner cube, intersecting planes, or any other suitable architecture may be used without deviating from the scope of the invention. Modulating operation of the retroreflector(s) may facilitate communications.

Retroreflectors fitted with mechanical or electronic shutters can serve as the basis for a communications system. An array of retroreflectors could be used to transmit information in a time series. Shutters with retroreflectors behind them, or rotating retroreflectors, could send two-dimensional data where the individual retroreflectors are "pixels". Shutters could be opened/closed to make any desired pattern, and any shape of array (linear, a contiguous shape, and/or separated shapes) may be used without deviating from the scope of the invention.

In order to communicate with a distant system, the interrogating system may emit laser light via one or more laser emitters. The reflected laser light from the system with the array would then be detected by photodetectors of the interrogating system. The system with the array may repeat a sequence without regard for what is transmitted by the interrogating system, include photodetectors to respond to queries from the interrogating system, etc. The frequency of the emitted laser light may indicate whether an inquiry is included in the laser light and/or the laser light may be modulated to form a query. The system with the array may then respond.

In some embodiments, the laser beam intensity is the same, so a viewer from the side cannot tell whether the reflected light from the array is a "1" or a "0". Also, light from other sources not aligned with the array would be reflected directly back at the emitter or would be absorbed or scattered in a different direction in some embodiments. Since propagating light does not interfere with propagating light, sources from different directions would not interfere with the communications.

In some embodiments, a retroreflector array may only be open and respond on a timed schedule. For instance, a scientific instrument package on the ground that is monitoring seismic activity or air pollution levels could start making its report at 12:03 pm and stop at 12:05 pm. In this manner, one would only need to interrogate the retroreflector array at certain times, which may save power and increase the operational lifetime or reduce maintenance required for the instrument. In order to synchronize clocks, both the interrogator system and the instrument may have GPS that makes use of a global universal clock, or alternatively, refer to some other external time reference.

Figure 9A:
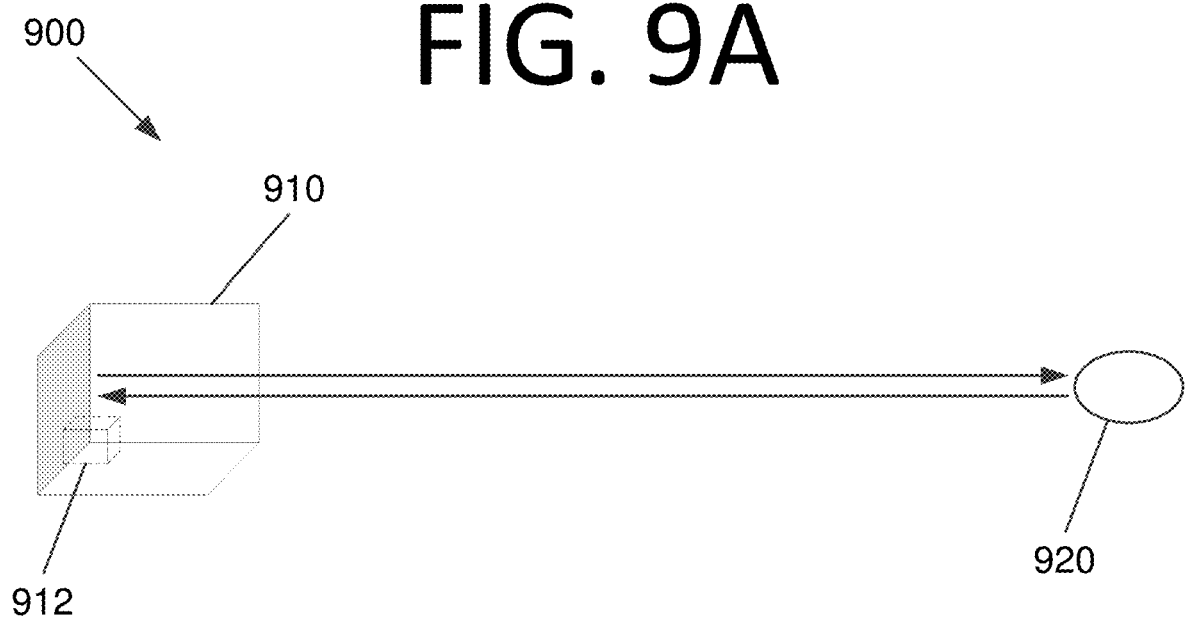
FIG. 9A illustrates a retroreflector-based communication system in a configuration that returns light to a source, according to an embodiment of the present invention.
Figure 9B:
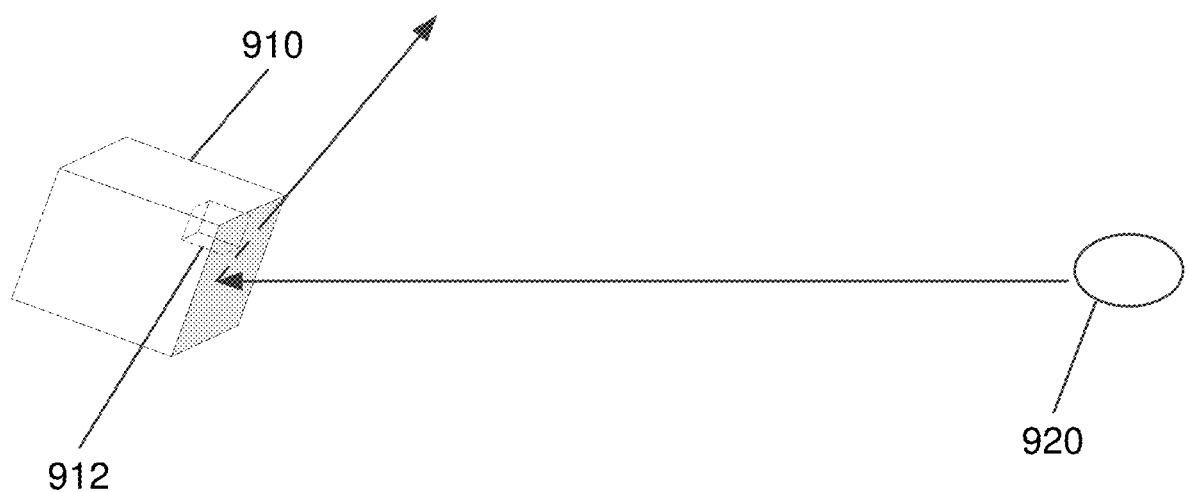
FIG. 9B illustrates the retroreflector-based communication system in a configuration that reflects light away from the source due to rotation of the retroreflector, according to an embodiment of the present invention.

FIGS. 9A and 9B illustrate a retroreflector communication system 900 configured to return light to an emitter/detector 920 and to reflect light in a different direction from emitter/detector 920, respectively, according to an embodiment of the present invention. Light striking a concave face (the portion visible in FIGS. 9A and 9B) of corner cube retroreflector 910 would be reflected back towards emitter/detector 920 when a motor 912 orients the concave face towards emitter/detector 920. More specifically, retroreflector 910 is oriented so that the light arriving from emitter/detector 920 falls within its angular aperture for retroreflection, and is therefore retroreflected back to the source.

However, when motor 912 rotates corner cube retroreflector 910 to a different orientation (in this embodiment, such that the light strikes the convex face of retroreflector 910), light is reflected away and does not return to emitter/detector 920. See FIG. 9B. In other words, retroreflector 910 is oriented so that the light arriving from emitter/detector 920 falls outside its angular aperture for retroreflection, and is therefore not retroreflected back to the source. Here, the light is shown being reflected in another direction. However, in some embodiments, a matte or absorptive coating may be applied on the back (concave) side of retroreflector 910 to eliminate any significant reflection of light in any direction. In the case of a conventional corner cube, no light would be reflected back to the source. However, with a multicube, a small amount of light may be reflected back unless the matte or coating is applied. It should be noted in some embodiments, retroreflector 910 may be rotated when reflecting light away from emitter/detector 920 such that light strikes the concave face, but little or no light returns to emitter/ detector 920, rather than orienting the convex face towards emitter/detector 920.

Figure 10A:
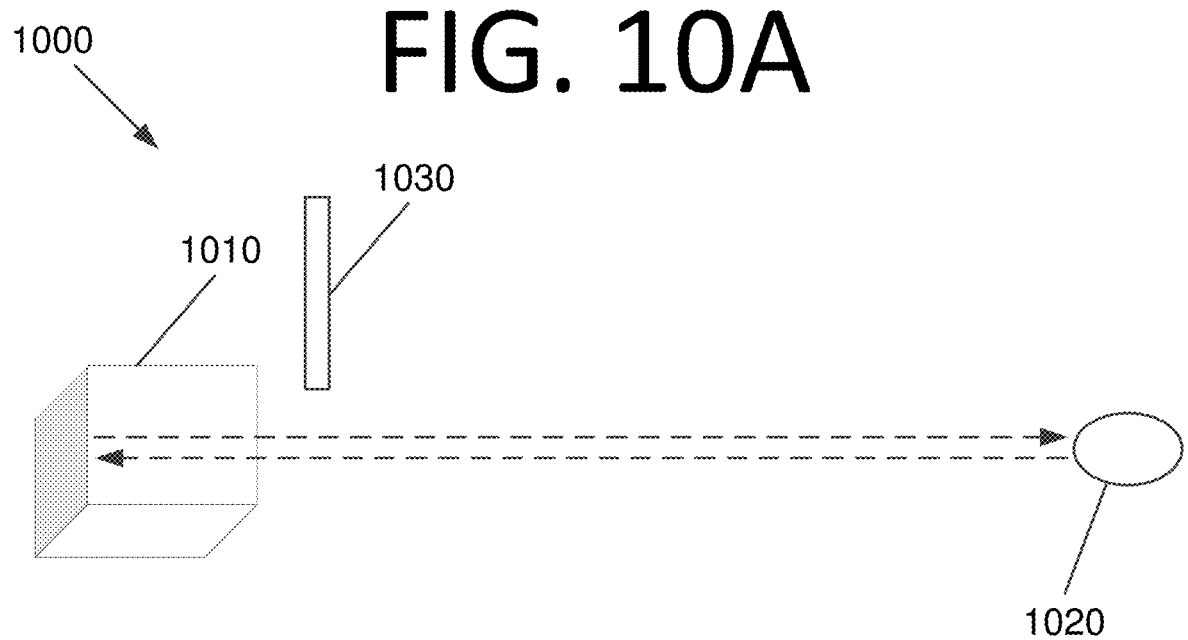
FIG. 10A illustrates a retroreflector-based communication system in a configuration that returns light to a source due to an open shutter, according to an embodiment of the present invention.
Figure 10B:
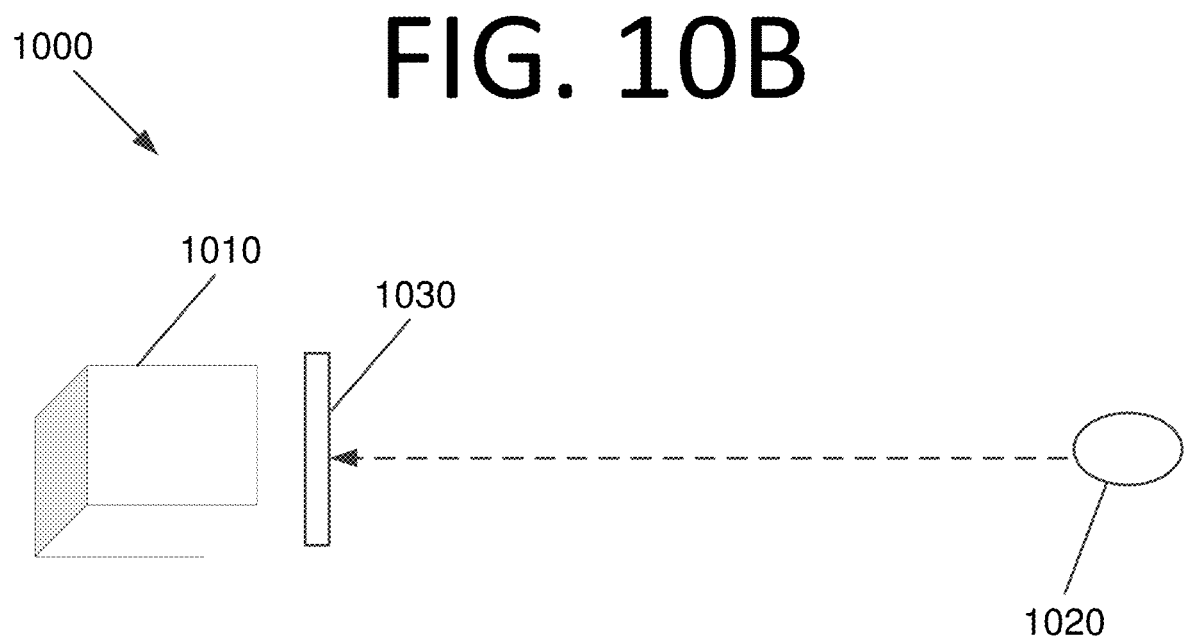
FIG. 10B illustrates a retroreflector communication system configured to absorb or scatter light from the source due to the shutter being closed, according to an embodiment of the present invention.

FIGS. 10A and 10B illustrate a retroreflector-based communication system 1000 in configurations that return light to a source due a shutter 1030 being open and absorbing or scattering light from the source due to shutter 1030 being closed, respectively, according to an embodiment of the present invention. When shutter 1030 is in an open position (FIG. 10A), light from emitter detector 1020 reaches retroreflector 1010 and is returned to the light source. When shutter 1030 is in a closed position (FIG. 10B), light from emitter/detector is blocked, and therefore, retroreflection of light back to the light source is prevented. This may be accomplished by applying a matte or absorptive coating to mitigate or prevent reflection or scattering of light in any direction.

There are several types of commercially available shutters commonly used in optical and other systems that can perform the function illustrated in FIGS. 10A and 10B in some embodiments. These include, but are not limited to, irises, blades or plates rotated on an axis, blades or plates moved in a linear fashion ala "guillotine" motion, blades or plates arranged in a periodic array and rotated (also known as optical "choppers"), and other techniques. There are several all-solid-state or electronic shutters that can perform the same purpose, the most common of which is the "liquid-crystal" shutter commonly used in flat-panel televisions, computer monitors, etc., to allow or block transmission of light from the back of the display to the surface of the display. Even faster optical "switching" may be obtained by using techniques and devices such as acousto-optic modulators, Pockles cells, etc. Nonlimiting, non-exhaustive examples of commercially available optical shutters of various types are provided by ThorLabs™. See https://www.thorlabs.com/navigation.cfm?guide_id=70.

A communication system based on retroreflectors may have several potential advantages.

Relative Simplicity and Light Weight

When there is an asymmetry between the two nodes in a communication link, as when an aircraft or ground station is controlling a remote vehicle, such as a UAV, it may be advantageous to drastically decrease the size, weight, and power requirements at one node (the UAV) at the expense of increasing them at the other node (i.e., the ground station or transmitting aircraft). In such a situation, retroreflector-based systems may provide a solution. They may be essentially passive in some embodiments, only requiring enough power to mechanically or optically modulate the retroreflector orientation, the shutter or filter position, or other mechanisms of modulating the return signal, while the power required to generate the incident light, and any systems needed to image the retroreflectors (as would be needed with an array of retroreflectors, as described below) would be at the other node, where size, weight, and power constraints are more relaxed.

Reduced Pointing and Tracking Requirements

Because a retroreflector can direct a significant fraction of its reflected light back along the direction of the incident light, provided that the light is coming from within its angular acceptance for retroreflection, the retroreflector only has to be oriented in the general direction of the transmitter. This is in comparison to a conventional optical link using lasers, in which the transmitters on both links must be carefully aligned with the receiver of the other node.

FIG. 11 illustrates a comparison 1100 of the high sensitivity of a conventional optical communication link (left) and the reduced sensitivity of a retroreflector communication link (right), according to an embodiment of the present invention. As shown in the top left, in the optical communication link, transmitters T1 and T2 send modulated light and receivers R1 and R2 receive modulated light when correctly oriented. However, as shown in the bottom left, when the node has become misaligned, light transmitted from T1 is not received by T2. In other words, R1 can receive information from T2, but cannot transmit information to R2.

This is contrasted with a retroreflector communication link. When aligned, as shown in the top right, the retroreflector also properly reflects light back to the transmitter. However, when the orientation of the retroflector with respect to the source is changed less than the angular acceptance of the retroreflector, as shown in the bottom right, light is still reflected back to the source. This eliminates the need for pointing and tracking systems to be installed on the node using retroreflectors, although pointing and tracking systems may still generally be needed on the other node.

Low Susceptibility to Interference

Figure 12:
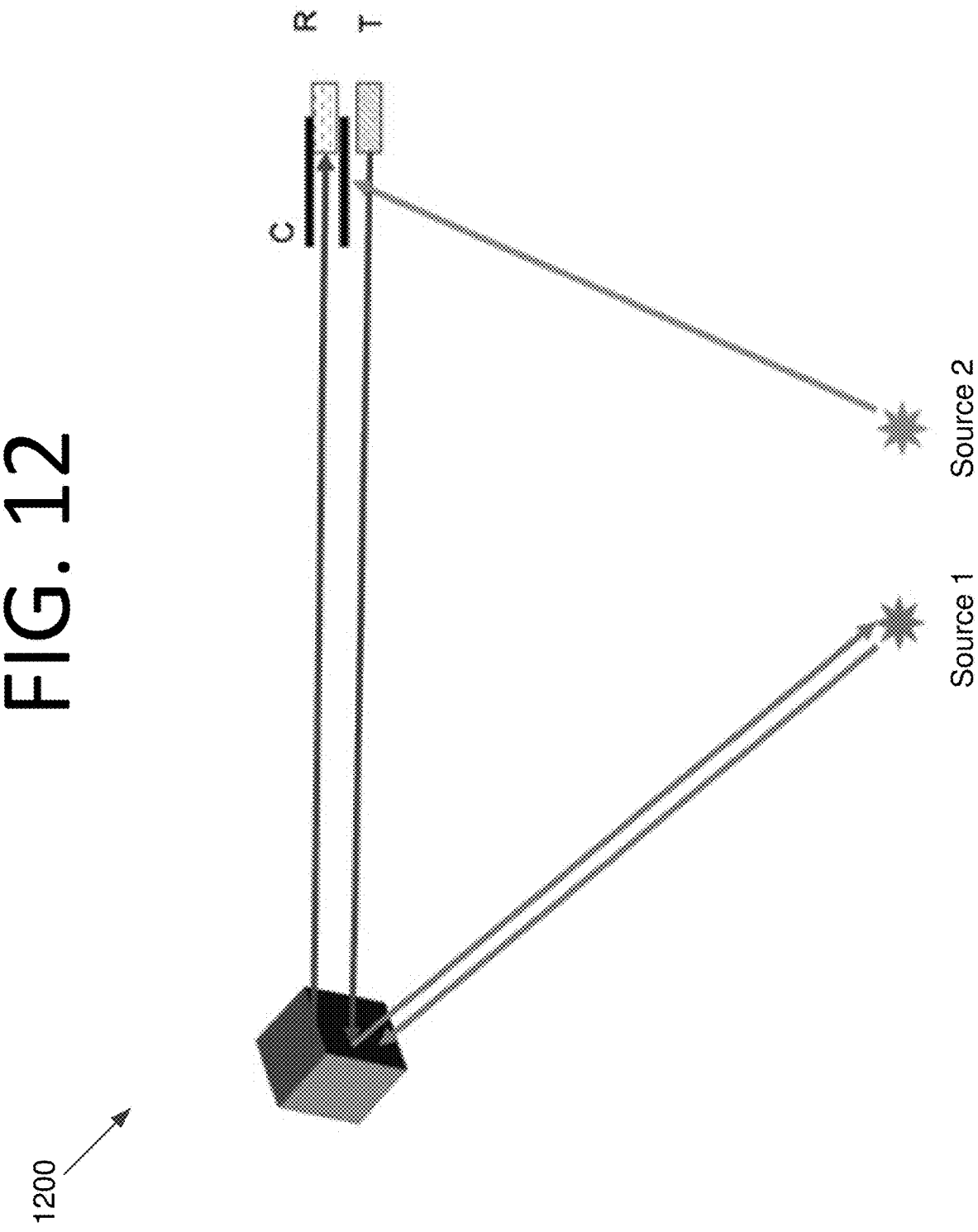
FIG. 12 illustrates a retroreflector-based communication system with two outside light sources, according to an embodiment of the present invention.

Because the retroreflector reflects the predominant amount of light back along the direction of the incident beam, light from outside sources would not interfere with communications. Optical collimators may also be used on the detector to prevent interference from light from off-axis sources at that node. FIG. 12 illustrates a retroreflector-based communication system 1200 with two outside light sources, according to an embodiment of the present invention. Light generated by light source T is retroreflected by a modulated retroreflector (cube on left) back to a receiver R, which incorporates a collimator C. Light from source 1 does not interfere with communication because its light is retroreflected back to source 1 rather than to the R. Also, light from source 2 striking the transmitter/receiver node does not interfere due to presence of the collimator.

Low Probability of Intercept and Secure Communications

Retroreflected light is only present along the line between the retroreflector and the transmitter. Some amount of light is likely to be scattered in other directions (for example, due to dust on the retroreflectors, or scattering or reflection off other components on the platform surrounding the retroreflector). FIGS. 13A and 13B illustrate scattering of light in retroreflector-based communication systems 1300, 1310 without and with a collimator, respectively, according to an embodiment of the present invention. A source of light is used to illuminate two retroreflectors. Retroreflector A is configured to retroreflect the light falling on it, which returns to the source. Retroreflector B is configured not to retroreflect. Both retroreflectors are housed in an assembly C, which could be any desired object. In addition to the retroreflected light from A, a small amount of light D will be scattered in other directions from the retroreflector surface (for example due to dust or scratches in the reflective coating). Similarly, light E will be scattered from the non-retroreflective surface of B, and light F will be scattered from assembly C.

The intensity of this scattered light is much less than that of the primary retroreflected beam, but could still be detected by other systems (e.g., the system of a hacker or other adversary). Additionally, the scattered light, when in retroreflective and non-retroreflective modes, is likely different, such that in switching between these states, the scattered light may be modulated in a way that could be detected by the adversary. Since these sources will be many orders of magnitude less than the incident or retroreflected light, the scattered light may be managed through applying matte finishes to most components.

Of more concern is the potential for the scattered light to be modulated by retroreflector elements switching from its retroreflecting to non-retroreflecting configuration, which could alter the characteristics of the scattered light. This is particularly true when the retroreflective elements are mechanically switched by altering their orientations. However, the probability of this happening could be greatly reduced by the use of one or more collimators (see FIG. 13B), which would be oriented in the general direction of the source. This preserves the feature that careful pointing and tracking can be avoided in some embodiments. Also, when an array of retroreflectors is used, decoding off-axis scattered light is complicated, especially when encoding schemes are used that preserve the total area of the array that is in its retroreflective configuration.

Figure 14A:
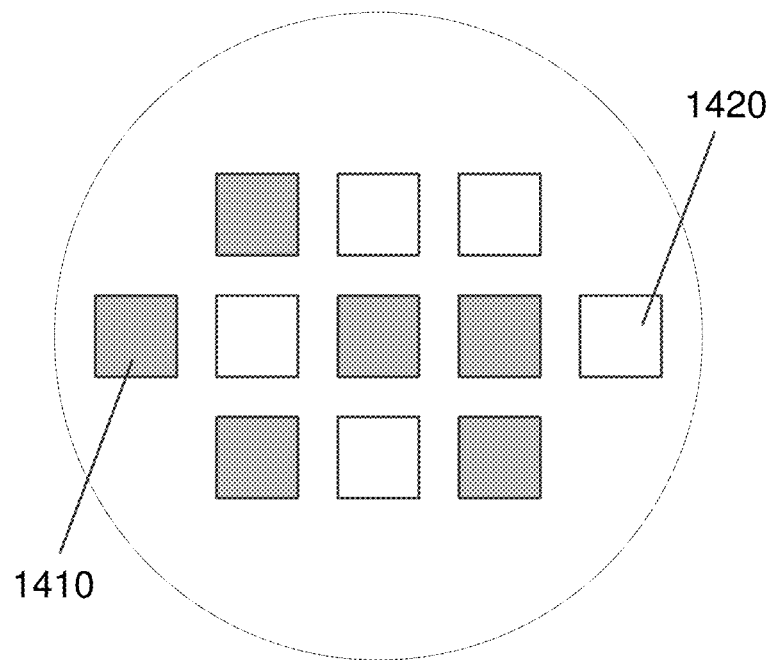
FIGS. 14A and 14B illustrate a retroreflective array in which the total area of the array which is in its retroreflective state (gray) is preserved, according to an embodiment of the present invention.
Figure 14B:
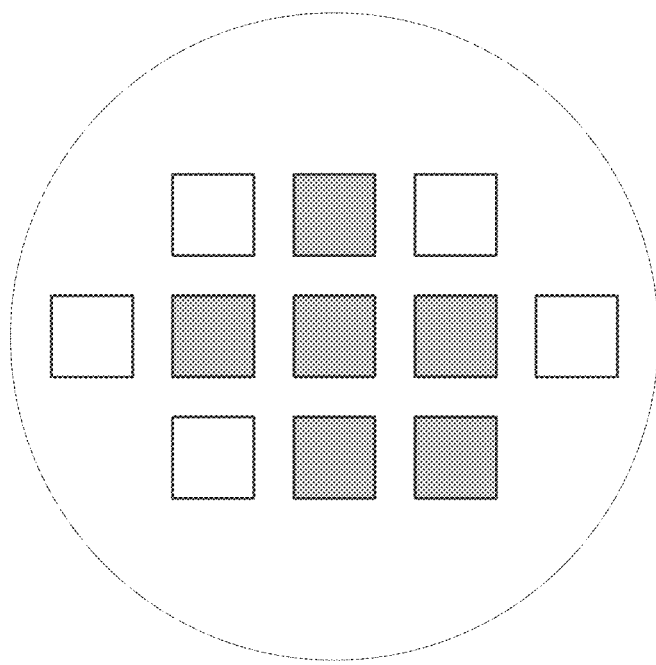

FIGS. 14A and 14B illustrate a retroreflective array 1400 in which the total area of the array which is in its retroreflective state (gray) is preserved, according to an embodiment of the present invention. More specifically, the number of retroreflecting elements 1410 and non-retroreflecting elements 1420 remains constant at six and five, respectively. Any desired array size and constant number of retroreflecting elements may be used without deviating from the scope of the invention. Naturally, the more array elements and the fewer retroreflectors that are illuminated, the more variations that are possible.

Figure 15:
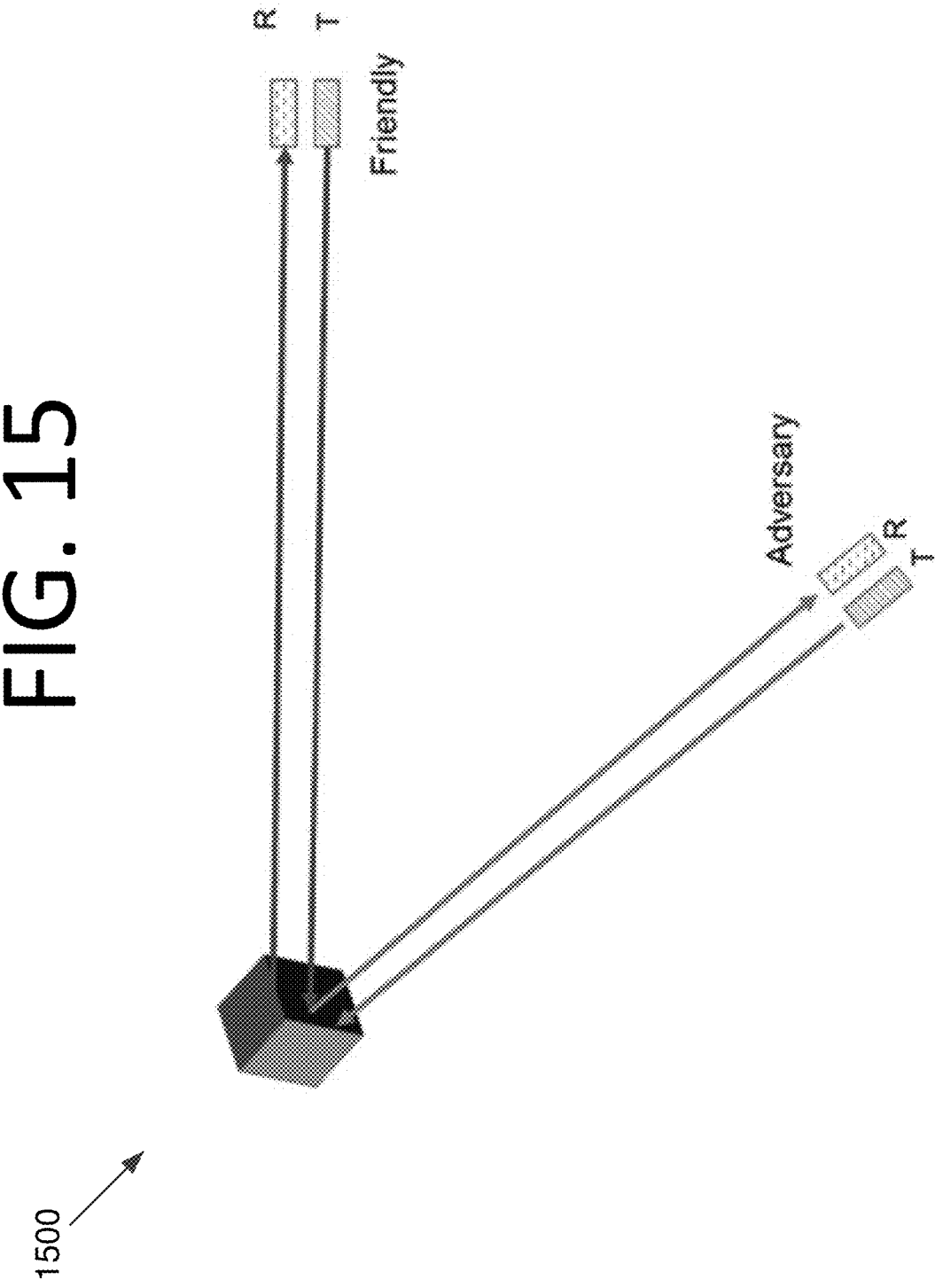
FIG. 15 illustrates a scenario where both a friendly node and an adversary node can interrogate a retroreflector, according to an embodiment of the present invention.

When used with wide band retroreflective elements, such as conventional silvered glass mirrors, a retroreflector based communications system is suitable for use with optical frequency hopping, to further reduce the likelihood of successful interception. However, one potential disadvantage of the use of retroreflectors in communication systems is the potential for off-axis interrogation. If an adversary, such as a hacker, knows of the existence of the retroreflective system and has a suitable laser and detector with suitable pointing, tracking, and imaging systems, the code transmitted by the retroreflectors can be read by the adversary. Such a scenario 1500 is shown in FIG. 15.

A number of techniques can be applied to mitigate this risk, such as using encryption. Collimators may be used (see FIG. 13B), which prevent off-axis interrogation from directions outside the angular acceptance of the collimator. Dummy modulation may be used where retroreflectors are alternately modulated with real data and with noise. The noise should have a similar retroreflector switching frequency as the data transmission in order to ensure that an adversary would not know when the retroreflectors were transmitting noise or data. This could be done at preplanned intervals, or when prompted by a modulation in the properties of the friendly interrogation laser (intensity, modulation pattern change, or carrier frequency), or by some other transmitted signal. Switching between noise and data at preplanned intervals could be coordinated by use of GPS satellite or other time-based signals (such as NIST channel WWV), which would be passive from the perspective of the retroreflective system.

Figure 16:
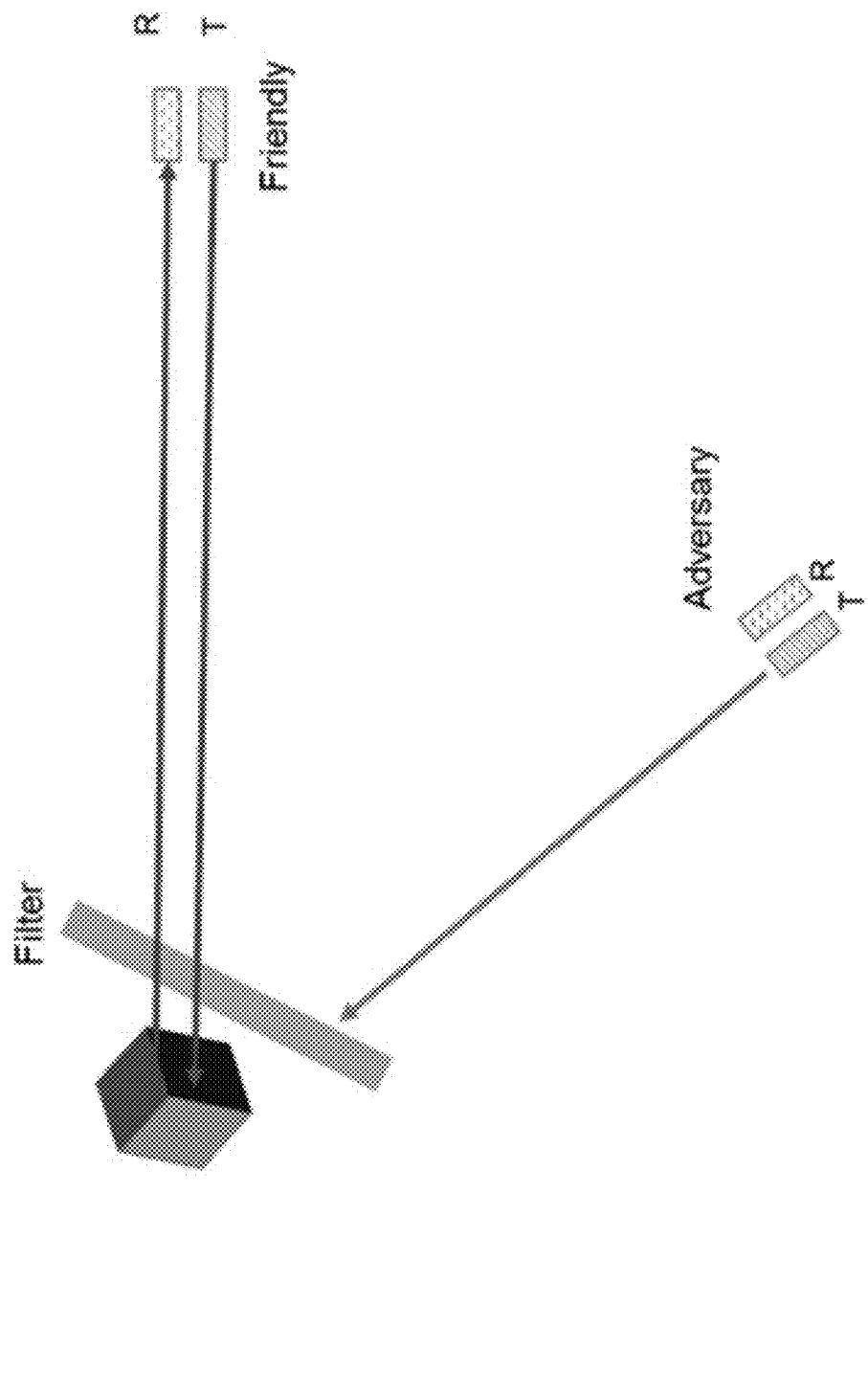
FIG. 16 illustrates a retroreflector-based communication system where a filter is used to mitigate against or prevent off-axis interrogation by an adversary, according to an embodiment of the present invention.

When used with an array, the regions of the array that are transmitting data rather than noise could be changed in a similar manner to dummy modulation, except here, only part of the array is switched from to noise to data at any given time. Color or polarization filters in front of the retroreflectors could also be used, preventing an adversary interrogation laser from reading the state of retroreflectors protected by filters designed to pass a different color light or a different polarization than the interrogation laser. Such a system 1600 is shown in FIG. 16. Additionally, in an array, different retroreflectors could be equipped with filters having different properties, thus requiring multiple laser beams to completely read the entire array. This prevents a single adversary laser of any type from reading the output of the entire array.

Dummy modulation could still be used, with the channel(s) on which real data is being transmitted shifting over time, either in response to a change in the interrogation signal or at preplanned times, as discussed above. In all of these systems, photodetector(s) embedded in the retroreflector system, which are sensitive to the color(s) and polarization(s) of the incident laser(s), would be useful to enable the interrogating laser to send signals to the platform carrying the retroreflector system. This allows two-way communications, enables sending commands to both the platform carrying the retroreflector system and to the system itself in order to turn it on, alters its performance, etc.

Figure 17:
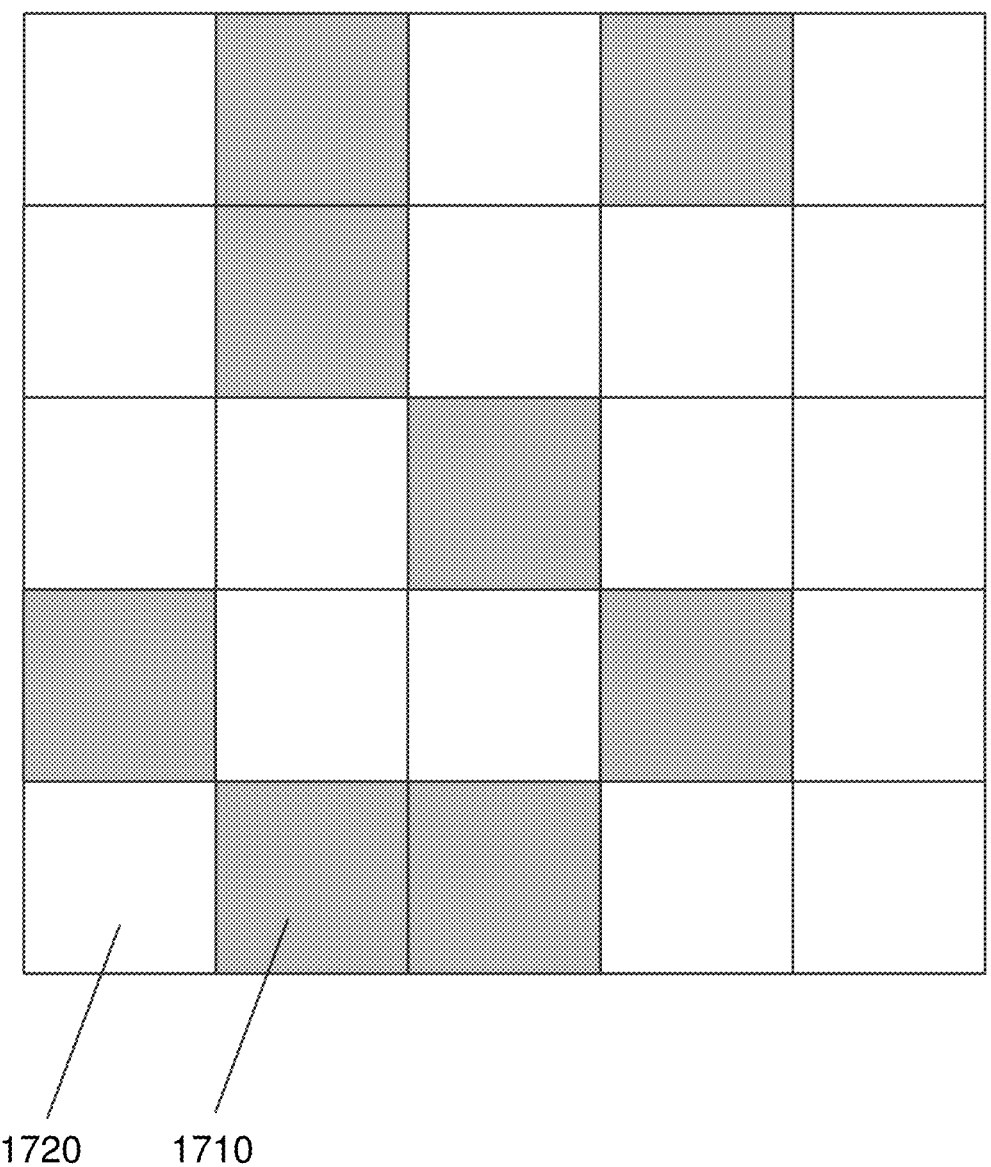
FIG. 17 illustrates a retroreflector array, according to an embodiment of the present invention.

It should be noted that arrays of retroreflectors may have any desired shape, size, and number of retroreflectors. For instance, retroreflectors may be arranged in a rectangular or square configuration that somewhat resembles a QR code in principle. Such a configuration is shown in retroreflector array 1700 of FIG. 17, which includes retroreflecting elements 1710 and non-retroreflecting elements 1720. Whether a given retroreflector is reflecting or non-reflecting at a given time may be controlled via operation of a motor, actuator, or shutter by an electronic control system, for example.

Figure 18:
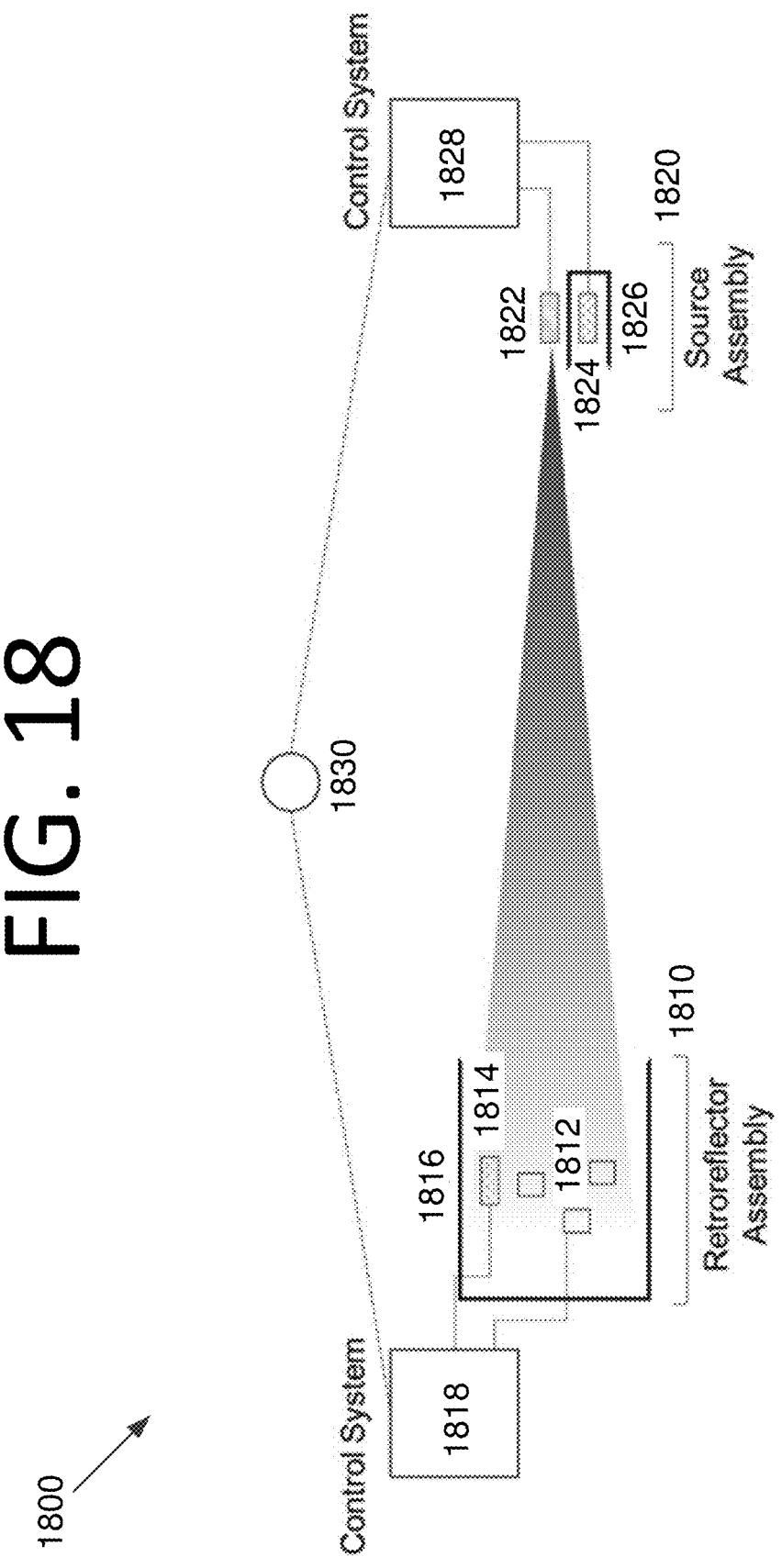
FIG. 18 is an architectural diagram illustrating a retroreflector-based communication system, according to an embodiment of the present invention.

FIG. 18 is an architectural diagram illustrating a retroreflector-based communication system 1800, according to an embodiment of the present invention. Communication system 1800 may be used for air-to-air communications, air-to-ground communications, air-to-sea communications, sea-to-air communications, sea-to-sea communications, sea-to-ground communications, ground-to-air communications, ground-to-sea communications, ground-to-ground communications, communications between terrestrial and space systems, and/or any other suitable communications without deviating from the scope of the invention. Also, any number or size of retroreflector array, multiple retroreflector arrays, and/or multiple light sources may be used without deviating from the scope of the invention.

Communication system 1800 includes a retroreflector assembly 1810 and a source assembly 1820. Retroreflector assembly includes retroreflectors 1812, a light-sensitive detector 1814, a collimator 1816 that reduces the field of view, and a control system 1818 that controls the operation of retroreflectors 1812. Examples of light-sensitive detectors include, but are not limited to, a telescope and digital camera, an array of photodiodes, or other unitary or array-type sensor intended to detect light. Control system 1818 may cause each retroreflector 1812 to reflect light or not in a series of time-based patterns responsive to modulated light received by light-sensitive detector 1814 in some embodiments. In certain embodiments, control system 1818 may encrypt communications from retroreflectors 1812.

Source assembly 1820 includes a laser transmitter 1822, a light-sensitive detector 1824 (e.g., a photodetector or array of light-sensitive elements), and a collimator 1826 that reduces the field of view. Source assembly also includes a control system 1828 that causes laser 1822 to transmit, modulates transmissions by laser 1822, and receives and processes data from light detected by light-sensitive detector 1824. For instance, control system 1828 may determine the pattern of retroreflectors 1812 that are reflecting, perform decryption, etc.

Source assembly 1820 is aligned such that light produced by laser 1822 and retroreflected by retroreflectors 1812 will be detected at detector 1824. The predominant amount of light reflected from retroreflectors 1812 may travel back along the path of the incident light. Modulation of the intensity of the retroreflected light may be accomplished by techniques including, but not limited to, mechanical reorientation of retroreflectors 1812 such that a non-retroreflective face of one or more retroreflectors 1812 is exposed, use of mechanical shutters between one or more of retroreflectors 1812 and laser 1822, and/or use of a mechanically or electrically controlled filter or polarizing element (not shown—see FIG. 16) between retroreflectors 1812 and the light source. In some embodiments, the modulation of retroreflectors 1812 in the array is used to impart a temporal and spatial modulation on the retroreflected light received at detector 1824 for the purpose of transmitting information to detector 1824.

In some embodiments, detector 1824 includes optics that allow imaging of retroreflectors 1812 on light-sensitive elements of detector 1824. In certain embodiments, detector 1824 includes a camera that records an image of the array of retroreflectors 1812. In certain embodiments, control system 1828 translates the spatial and temporal modulation of the light retroreflected by retroreflectors 1812 into machine-readable data. In some embodiments, the properties of the light (e.g., frequency and/or intensity) produced by laser 1822 are modulated in time (e.g., by control system 1828). In certain embodiments, the modulated light signal produced by laser 1822 is received by detector 1814, and is used to transmit information from source assembly 1820 retroreflector assembly 1810.

In some embodiments, retroreflectors 1812 and/or detector 1814 are enclosed in collimator 1816 to reduce the field of view of these components. In certain embodiments, each retroreflector is enclosed in its own collimator to reduce its field of view. For instance, such a configuration is shown in collimated retroreflector array 1900 of FIG. 19. In FIG. 19, each retroreflector 1910 is located within a respective collimator 1920.

In some embodiments, laser 1822 produces light at more than one frequency. In certain embodiments, the array of retroreflectors 1812 includes at least two different types of switchable retroreflectors, such that each type of switchable retroreflector reflects a different region of the electromagnetic spectrum. In some embodiments, control system 1818, control system 1828, or both, receive electromagnetic signals from a third source 1830 (e.g., a satellite, a vehicle, aircraft, a ground station, etc.), such as timing information, control information, data requests, etc.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An retroreflector, comprising:
    an outer corner cube and an inner corner cube formed within the outer corner cube, wherein
    each of the outer corner cube and the inner corner cube comprises three planes, and
    the inner corner cube is smaller than the outer corner cube, wherein
    the outer corner cube is convex and the inner corner cube is concave, or the outer corner cube is concave and the inner corner cube is convex.

2. The retroreflector of claim 1, wherein
    the apparatus is stamped from a single sheet of metal or assembled from individual retroreflectors into a shape, and
    the apparatus is naturally mirrored and/or covered in a reflective coating on one or both sides before or after fabrication.

3. The retroreflector of claim 1, wherein the apparatus is configured to reflect at least 50% more light than a single corner cube alone.

4. The retroreflector of claim 1, wherein the apparatus is configured to form a deployable stack when nested with other apparatuses of a same shape.

5. The retroreflector of claim 1, wherein the inner corner cube is 50% of a size of the outer corner cube.

6. The retroreflector of claim 1, wherein a size of the inner corner cube is half a size of the outer corner cube or less.

7. The retroreflector of claim 1, further comprising:
one or more additional inner corner cubes formed at different locations on the outer corner cube than the inner corner cube, on the inner corner cube, or both.

8. A multicube retroreflector, comprising:
a first corner cube;
a second corner cube formed within the first corner cube; and
a third corner cube formed within the first corner cube or the second corner cube, wherein
each of the first corner cube, the second corner cube, and the third corner cube comprises three planes.

9. The multicube retroreflector of claim 8, wherein
the multicube retroreflector is stamped from a single sheet of metal or assembled from individual retroreflectors into a shape, and
the retroreflector is naturally mirrored and/or covered in a reflective coating on one or both sides before or after fabrication.

10. The multicube retroreflector of claim 8, wherein the first corner cube is and the second corner cube are convex and the third corner cube is concave, or the first corner cube and the second corner cube are concave and the third corner cube is convex.

11. The multicube retroreflector of claim 8, wherein the multicube retroreflector is configured to reflect at least 50% more light than a single corner cube alone.

12. The multicube retroreflector of claim 8, wherein the multicube retroreflector is configured to form a deployable stack when nested with other multicube retroreflectors of a same shape.

13. The multicube retroreflector of claim 8, wherein the second corner cube is 50% of a size of the first corner cube.

14. The multicube retroreflector of claim 8, wherein sizes of the second corner cube and third corner cube relative to the first corner cube are selected depending on a wavelength of light to be reflected by the multicube retroreflector.

15. A deployable stack of reflectors, comprising:
a plurality of multicube retroreflectors packed proximate to one another, wherein
each of the multicube retroreflectors comprises an outer corner cube and an inner corner cube formed within the outer corner cube, and
each of the outer corner cube and the inner corner cube includes three planes, wherein
the outer corner cube is convex and the inner corner cub is concave, or the outer corner cub is concave and the inner corner cube is convex.

16. The deployable stack of reflectors of claim 15, wherein
each retroreflector is stamped from a single sheet of metal or assembled from individual retroreflectors into a shape, and
each retroreflector is naturally mirrored and/or covered in a reflective coating on one or both sides before or after fabrication.

17. The deployable stack of retroreflectors of claim 15, wherein a size of the inner corner cube is half a size of the outer corner cube or less.

18. The deployable stack of retroreflectors of claim 15, wherein each retroreflector further comprises:
one or more additional inner corner cubes formed at different locations on the outer corner cube than the inner corner cube, on the inner corner cube, or both.

* * * * *